(12) United States Patent
Ochitani

(10) Patent No.: US 6,912,536 B1
(45) Date of Patent: Jun. 28, 2005

(54) APPARATUS AND METHOD FOR PRESENTING DOCUMENT DATA

(75) Inventor: Ryo Ochitani, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/360,487

(22) Filed: Jul. 23, 1999

(30) Foreign Application Priority Data

Dec. 4, 1998  (JP) .......................................... 10-345709

(51) Int. Cl.7 ............................................. G06F 17/30
(52) U.S. Cl. ............................ 707/100; 707/3; 707/10; 715/514
(58) Field of Search ........................ 707/1–10, 200–205, 707/100–154.1; 709/9, 219; 345/810, 700; 715/514

(56) References Cited

U.S. PATENT DOCUMENTS

| | | | | |
|---|---|---|---|---|
| 5,802,518 A | * | 9/1998 | Karaev et al. ................. | 707/9 |
| 5,918,222 A | * | 6/1999 | Fukui et al. .................... | 707/1 |
| 6,185,576 B1 | * | 2/2001 | McIntosh ..................... | 707/200 |

FOREIGN PATENT DOCUMENTS

| | | | |
|---|---|---|---|
| JP | 5-233709 | 9/1993 | .......... G06F/15/40 |
| JP | 6-35971 | 2/1994 | .......... G06F/15/40 |
| JP | 7-85103 | 3/1995 | .......... G06F/17/30 |
| JP | 9-190443 | 7/1997 | .......... G06F/15/40 |
| JP | 10-055368 | 2/1998 | .......... G06F/17/30 |

* cited by examiner

*Primary Examiner*—Mohammad Ali
(74) *Attorney, Agent, or Firm*—Staas & Halsey LLP

(57) ABSTRACT

A word id extracted from dated document data, and the number of occurrences of the word can be obtained by adding up the number of the extracted word for each field and period. Furthermore, a word indicating a large number of occurrences in each field and period is extracted as a characteristic word. When a user specifies a field and a period, characteristic words in the document data in the specified period are displayed. When the user selects a specific characteristic word, the header, etc. of the document data containing the characteristic word is displayed.

23 Claims, 62 Drawing Sheets

10 DOCUMENT DATA

| DOCUMENT ID | CONTENTS OF DOCUMENT |
|---|---|
| ID 1 | CONTENTS 1 |
| ID 2 | CONTENTS 2 |
| ... | ... |

F I G. 5 A

22 DATED DOCUMENT DATA

| DOCUMENT ID | DOCUMENT DATE (GENERATION DATE, DATE IN CONTENTS) |
|---|---|
| ID 1 | DATE 1-1, DATE 1-2, ... |
| ID 2 | DATE 2-1, DATE 2-2, ... |
| ... | ... |

F I G. 5 B

FIELD PROPERTY VECTOR

| WORD | NUMBER OF OCCURRENCES |
|---|---|
| WORD 1 — 1 | NUMBER OF OCCURRENCES 1 — 1 |
| WORD 1 — 2 | NUMBER OF OCCURRENCES 1 — 2 |
| ... | ... |

F I G. 7

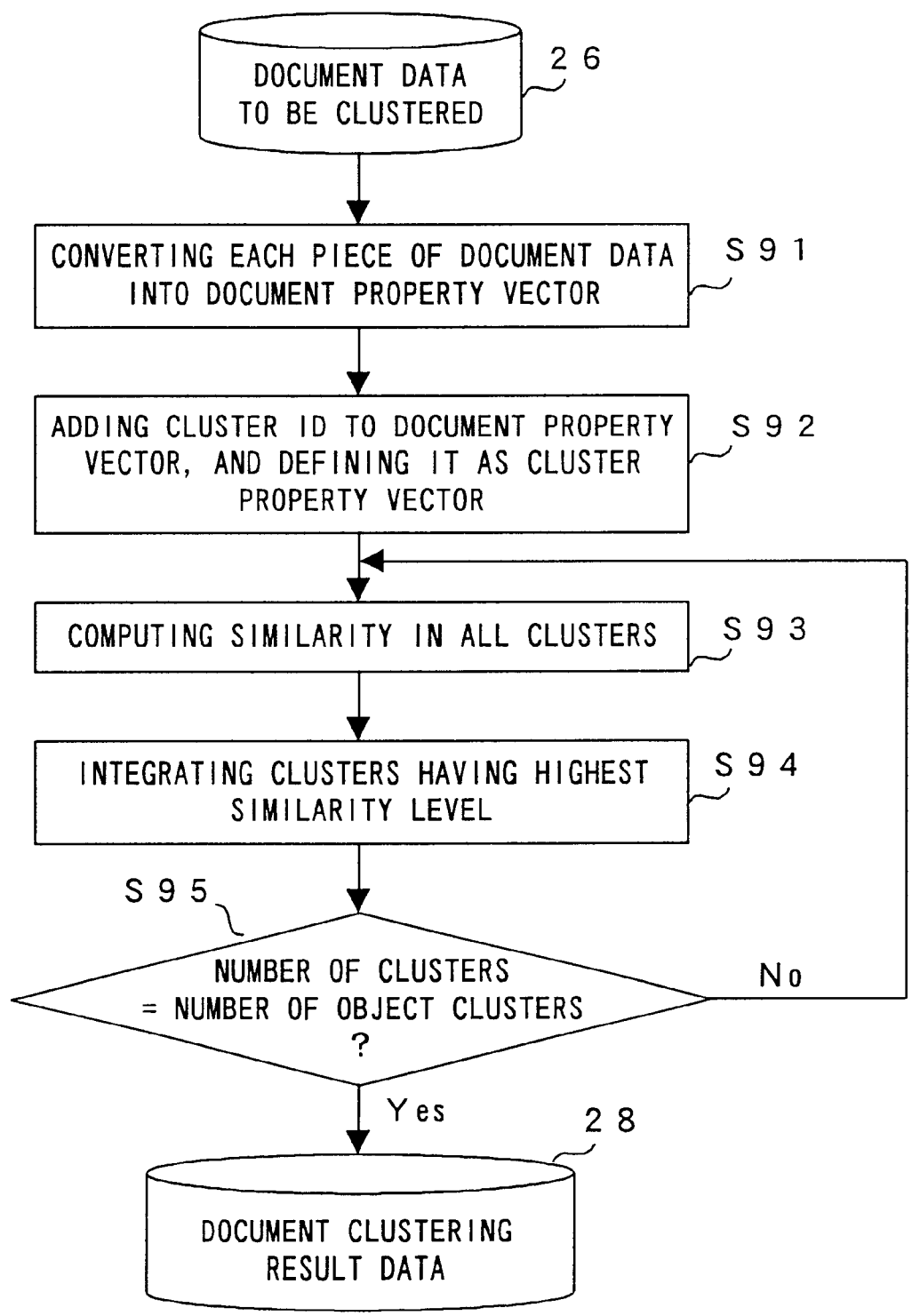
F I G. 9

28 DOCUMENT CLUSTERING RESULT DATA

| CLUSTER NAME | TEXT ID |
|---|---|
| CLUSTER 1 | TEXT 1-1 |
| CLUSTER 1 | TEXT 1-2 |
| ... | ... |
| CLUSTER 2 | TEXT 2-1 |
| CLUSTER 2 | TEXT 2-2 |
| ... | ... |
| ... | ... |

FIG. 10

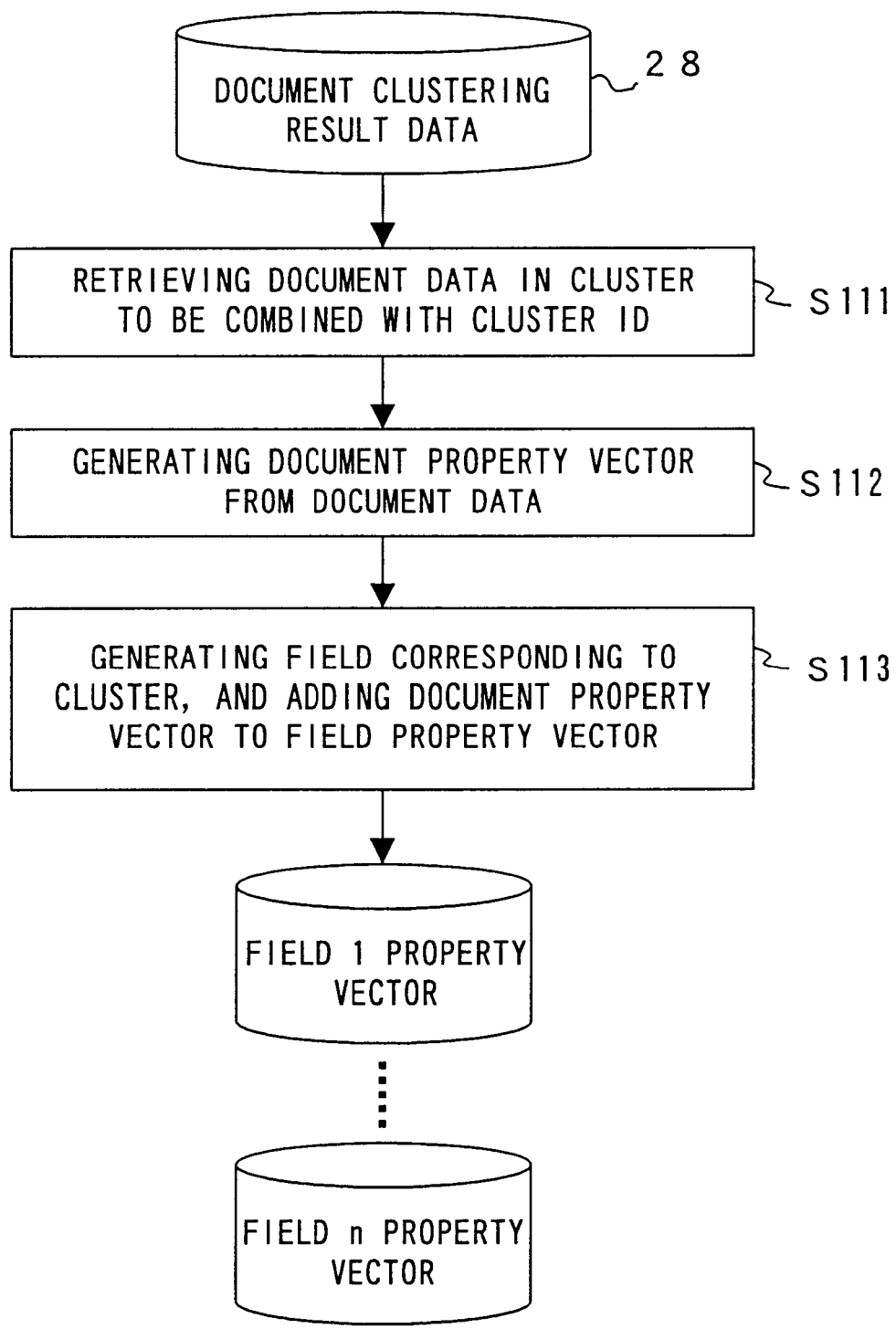
F I G. 1 1

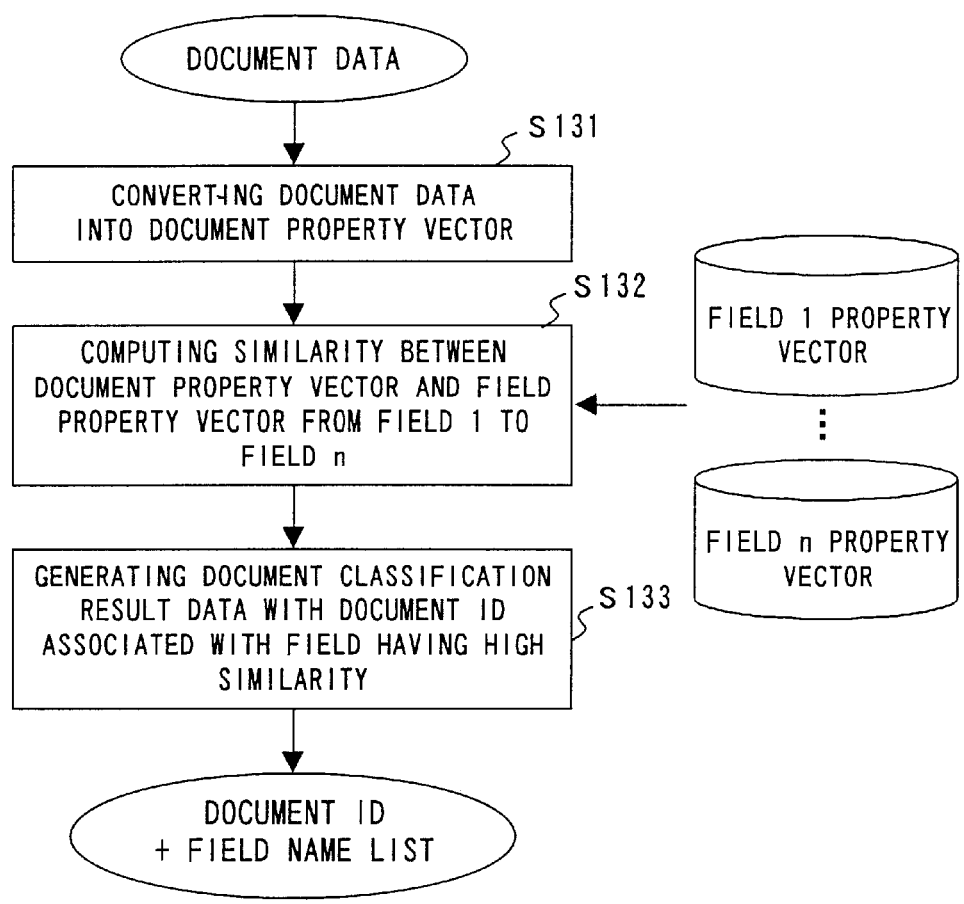
F I G. 1 3

30 DOCUMENT CLASSIFICATION RESULT DATA

| DOCUMENT ID | DOCUMENT FIELD |
|---|---|
| ID1 | FILED 1-1, FILED 1-2, ... |
| ID2 | FILED 2-1, FILED 2-2, ... |
| ... | ... |

F I G. 1 4

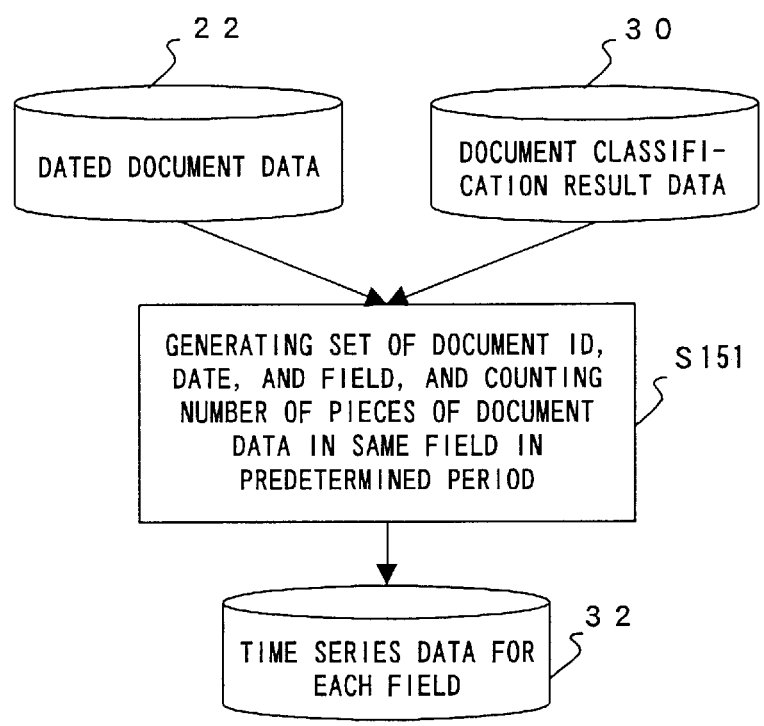
F I G. 1 5

32 TIME SERIES DATA FOR EACH FIELD

| FIELD | PERIOD | NUMBER OF DOCUMENTS |
|---|---|---|
| FIELD 1 | PERIOD 1 — 1 | NUMBER OF DOCUMENTS 1-1 |
| FIELD 2 | PERIOD 1 — 2 | NUMBER OF DOCUMENTS 1-2 |
| ... | ... | ... |
| FIELD 1 | PERIOD 1 — m | NUMBER OF DOCUMENTS 1-m |
| FIELD 2 | PERIOD 2 — 1 | NUMBER OF DOCUMENTS 2-1 |
| FIELD 2 | PERIOD 2 — 2 | NUMBER OF DOCUMENTS 2-2 |
| ... | ... | ... |
| FIELD 2 | PERIOD 2 — m | NUMBER OF DOCUMENTS 2-m |
| ... | ... | ... |

FIG. 16

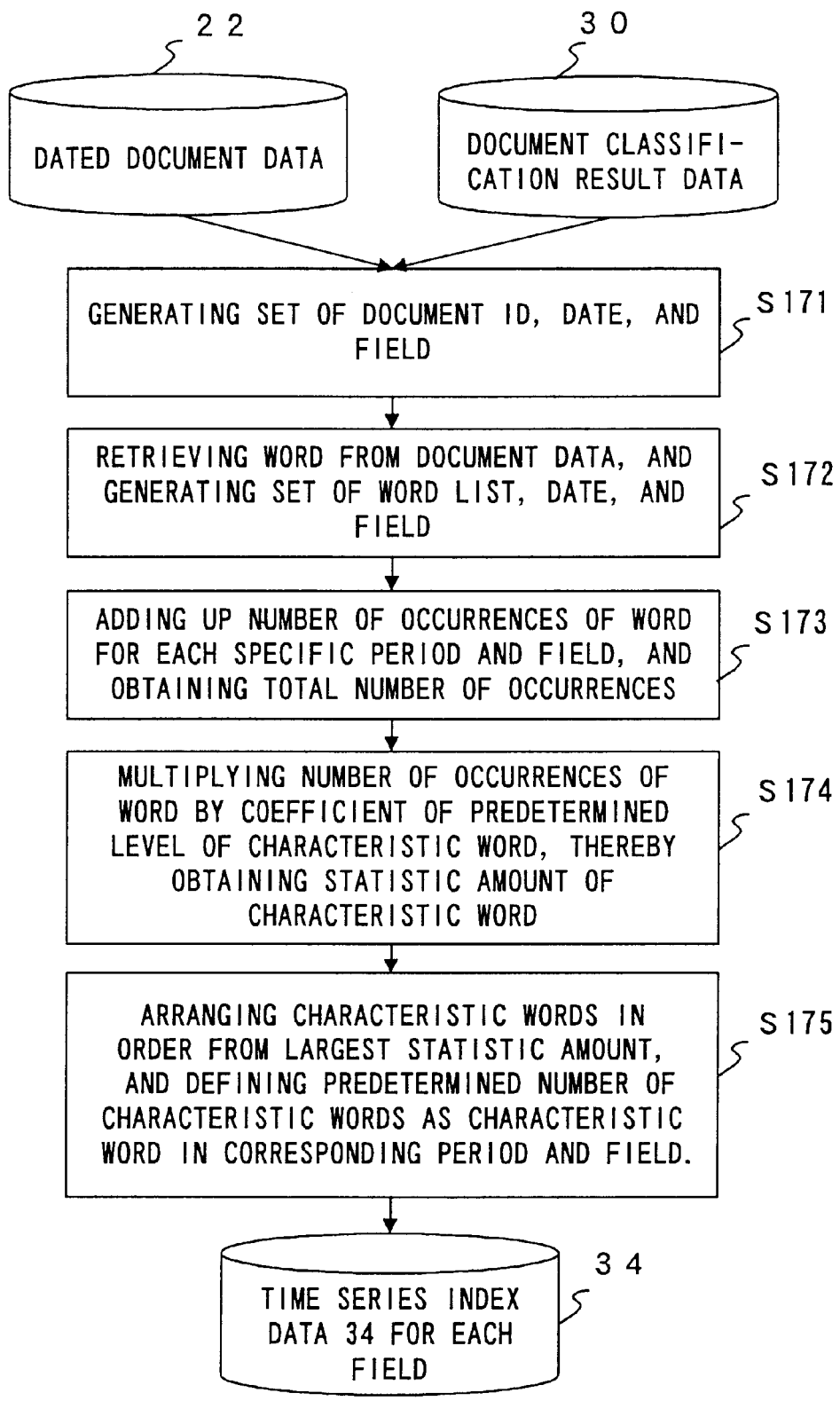
F I G. 1 7

34 TIME SERIES INDEX DATA FOR EACH FIELD

| FIELD | PERIOD | CHARACTERISTIC WORD | | |
|---|---|---|---|---|
| FIELD 1 | PERIOD 1-1 | CHARACTERISITC WORD 1-1-1, | CHARACTERISTIC WORD 1-1-2, | CHARACTERISTIC WORD 1-1-k₁₋₁, |
| FIELD 1 | PERIOD 1-2 | CHARACTERISITC WORD 1-2-1, | CHARACTERISTIC WORD 1-2-2, | CHARACTERISTIC WORD 1-2-k₁₋₂, |
| ⋮ | ⋮ | ⋮ | | |
| FIELD 1 | PERIOD 1-m | CHARACTERISITC WORD 1-m-1, | CHARACTERISTIC WORD 1-m-2, | CHARACTERISTIC WORD 1-m-k₁₋ₘ, |
| FIELD 2 | PERIOD 2-1 | CHARACTERISITC WORD 2-1-1, | CHARACTERISTIC WORD 2-1-2, | CHARACTERISTIC WORD 2-1-k₂₋₁, |
| FIELD 2 | PERIOD 2-2 | CHARACTERISITC WORD 2-2-1, | CHARACTERISTIC WORD 2-2-2, | CHARACTERISTIC WORD 2-2-k₂₋₂, |
| ⋮ | ⋮ | ⋮ | | |
| FIELD 2 | PERIOD 2-m | CHARACTERISITC WORD 2-m-1, | CHARACTERISTIC WORD 2-m-2, | CHARACTERISTIC WORD 2-m-k₂₋ₘ, |
| ⋮ | ⋮ | ⋮ | | |

FIG. 18

| CHARACTERISTIC WORD | NUMBER OF OCCURRENCES |
|---|---|
| CHARACTERISTIC WORD 1 | NUMBER OF OCCURRENCES 1 |
| CHARACTERISTIC WORD 2 | NUMBER OF OCCURRENCES 2 |
| ... | ... |

F I G. 24

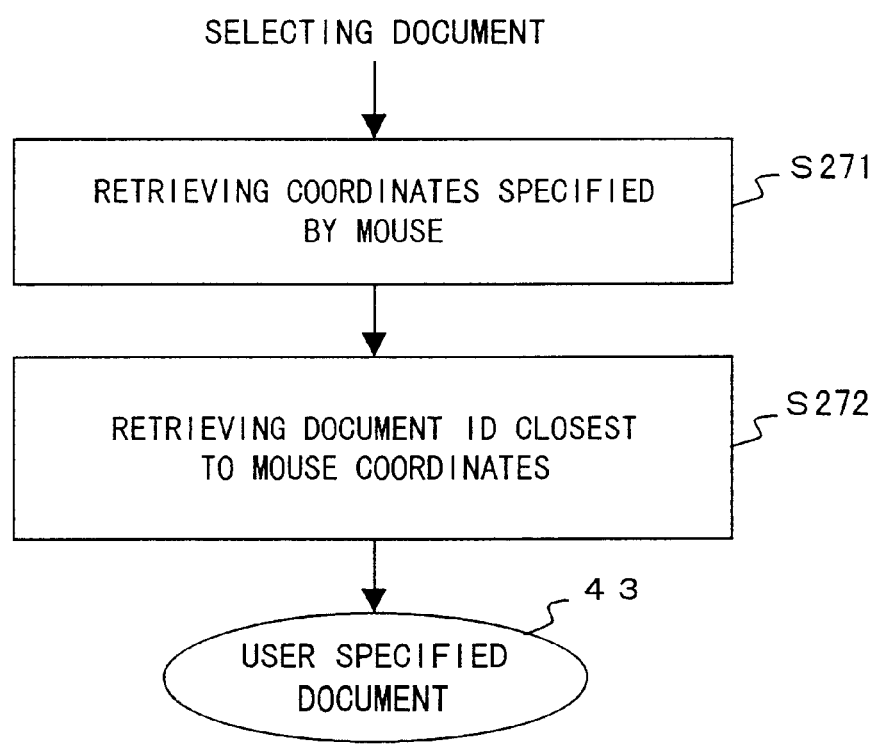
F I G. 27

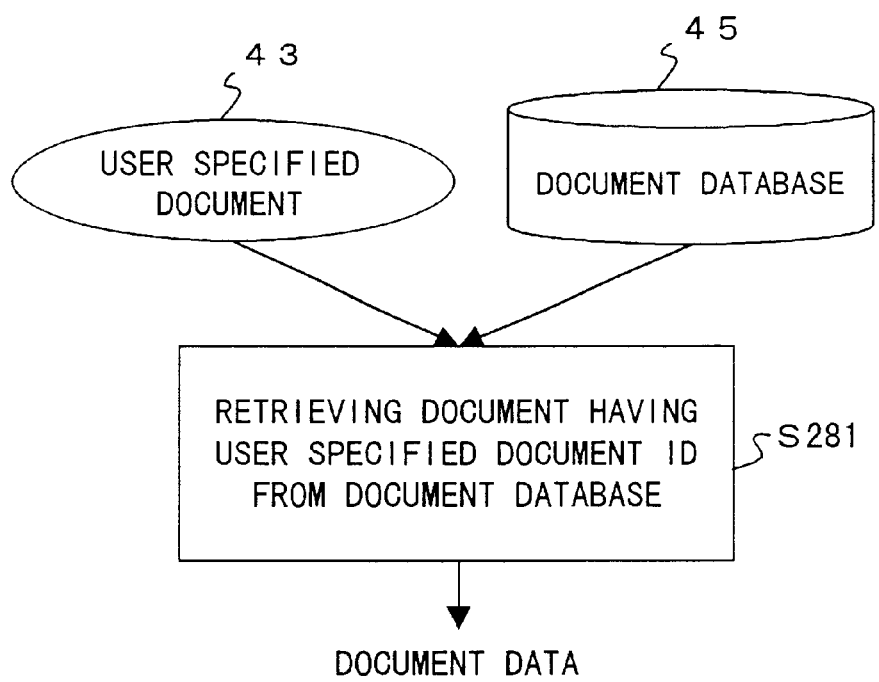
F I G. 2 8

A LIST OF DOCUMENTS CONTAINING THE
CHARACTERISTIC WORD w IN THE FIELD i IN
THE PERIOD k

| DOCUMENT ID | DOCUMENT HEADER |
|---|---|
| I D 1 | HEADER 1 |
| I D 2 | HEADER 2 |
| ... | ... |

F I G.  3 0 A

| DOCUMENT ID |
|---|
| DOCUMENT HEADER |
| BODY TEXT |
| ... |
| ... |
| ... |

F I G.  3 0 B

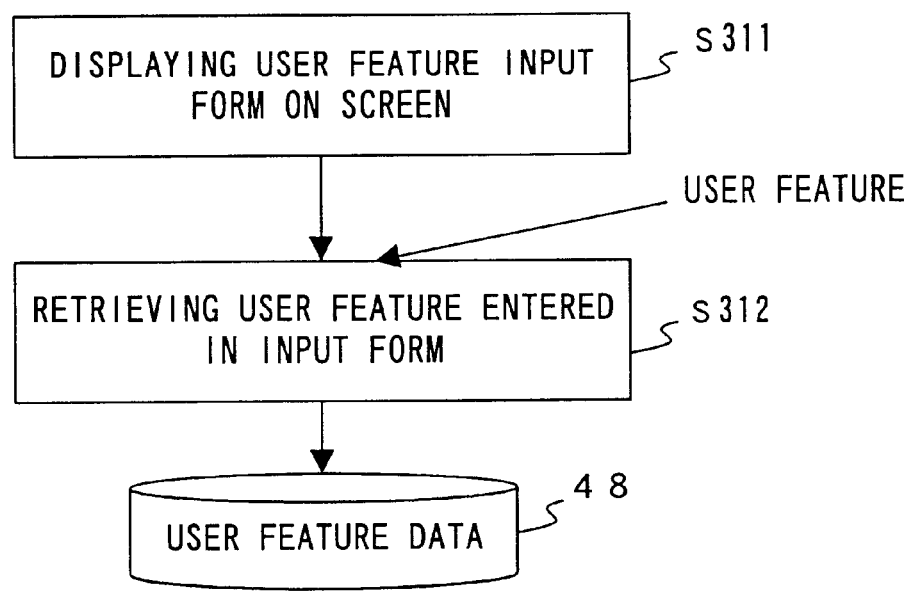
F I G. 3 1

INPUT FIELD
                                                  ↓
              COMPANY NAME  [                    ]

BUSINESS TYPE [                    ]

OFFICE ADDRESS   ┌─────────────────────┐
        SECTION IN COMPANY TO│                     │
        WHICH USER BELONGS └─────────────────────┘

POSITION [                    ]

USER NAME [                    ]

GENDER  [                    ]

AGE  [                    ]

ITEM OF INTEREST  [          ]  [          ]

48 USER FEATURE DATA

| USER ID | OCCUPATION | ADDRESS | AGE | INTEREST |
|---|---|---|---|---|
| USER 1 | OCCUPATION 1 | ADDRESS 1 | AGE 1 | INTEREST 1-1, INTEREST 1-2,.... |
| USER 2 | OCCUPATION 2 | ADDRESS 2 | AGE 2 | INTEREST 2-1, INTEREST 2-2,.... |
| ... | ... | ... | ... | ... |

F I G. 3 3 A

| FEATURE NAME | VALUE |
|---|---|
| COMPANY NAME | KK zz |
| TYPE OF COMPANY | MANUFACTURER OF COMPUTER |
| OCCUPATION | ENGINEER |
| ... | ... |

F I G. 3 3 B

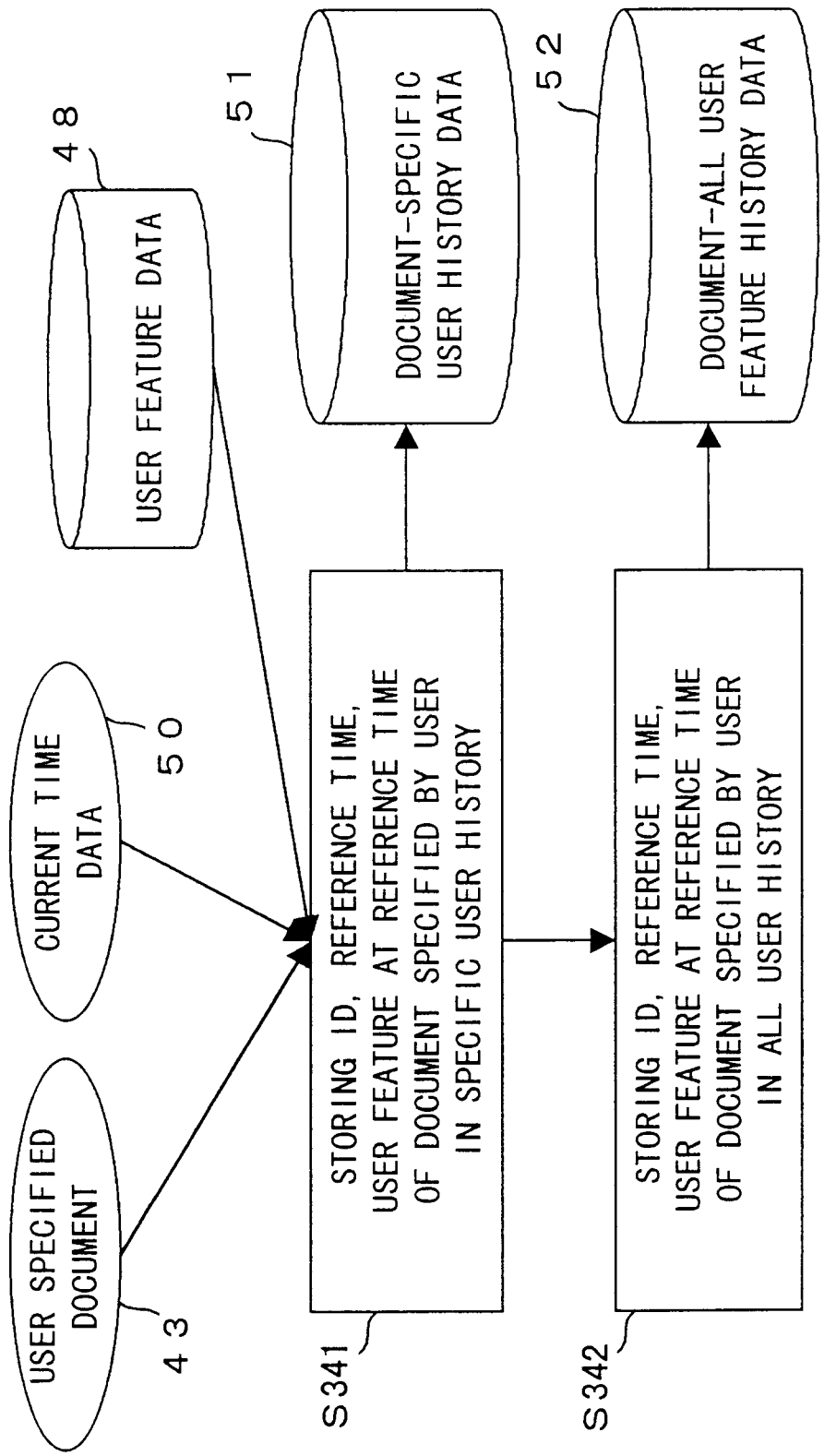
F I G. 34

5_1 DOCUMENT-SPECIFIC USER HISTORY DATA

DOCUMENT DESIGNATION HISTORY OF USER A

| DOCUMENT ID | ACCESS TIME | OCCUPATION | ADDRESS | AGE | INTEREST |
|---|---|---|---|---|---|
| DOCUMENT da1 | ACCESS TIME 1 | OCCUPATION 1 OF USER A AT TIME 1 | ADDRESS 1 OF USER A AT TIME 1 | AGE 1 OF USER A AT TIME 1 | INTEREST 1-1, 1-2,...OF USER A AT TIME 1 |
| DOCUMENT da2 | ACCESS TIME 2 | OCCUPATION 2 OF USER A AT TIME 2 | ADDRESS 2 OF USER A AT TIME 2 | AGE 2 OF USER A AT TIME 2 | INTEREST 2-1, 2-2,...OF USER A AT TIME 2 |
| ... | | | | | |

FIG. 35A

5_2 DOCUMENT-ALL USER FEATURE HISTORY DATA

| DOCUMENT ID | ACCESS TIME | OCCUPATION | ADDRESS | AGE | INTEREST | USER ID |
|---|---|---|---|---|---|---|
| DOCUMENT d1 | ACCESS TIME 1 | OCCUPATION 1 OF USER X AT TIME 1 | ADDRESS 1 OF USER X AT TIME 1 | AGE 1 OF USER X AT TIME 1 | INTEREST 1-1, 1-2,...OF USER X AT TIME 1 | X |
| DOCUMENT d2 | ACCESS TIME 2 | OCCUPATION 2 OF USER Y AT TIME 2 | ADDRESS 2 OF USER Y AT TIME 2 | AGE 2 OF USER Y AT TIME 2 | INTEREST 2-1, 2-2,...OF USER Y AT TIME 2 | Y |
| ... | | | | | | |

FIG. 35B

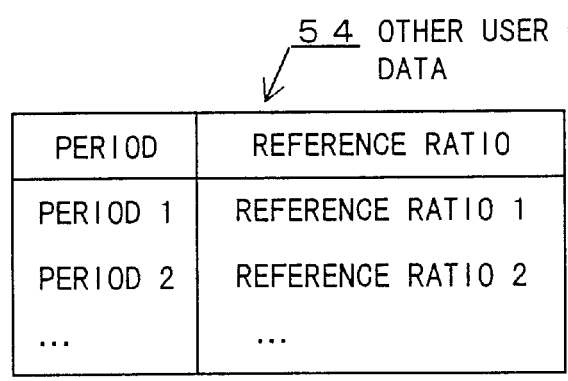
F I G. 3 7

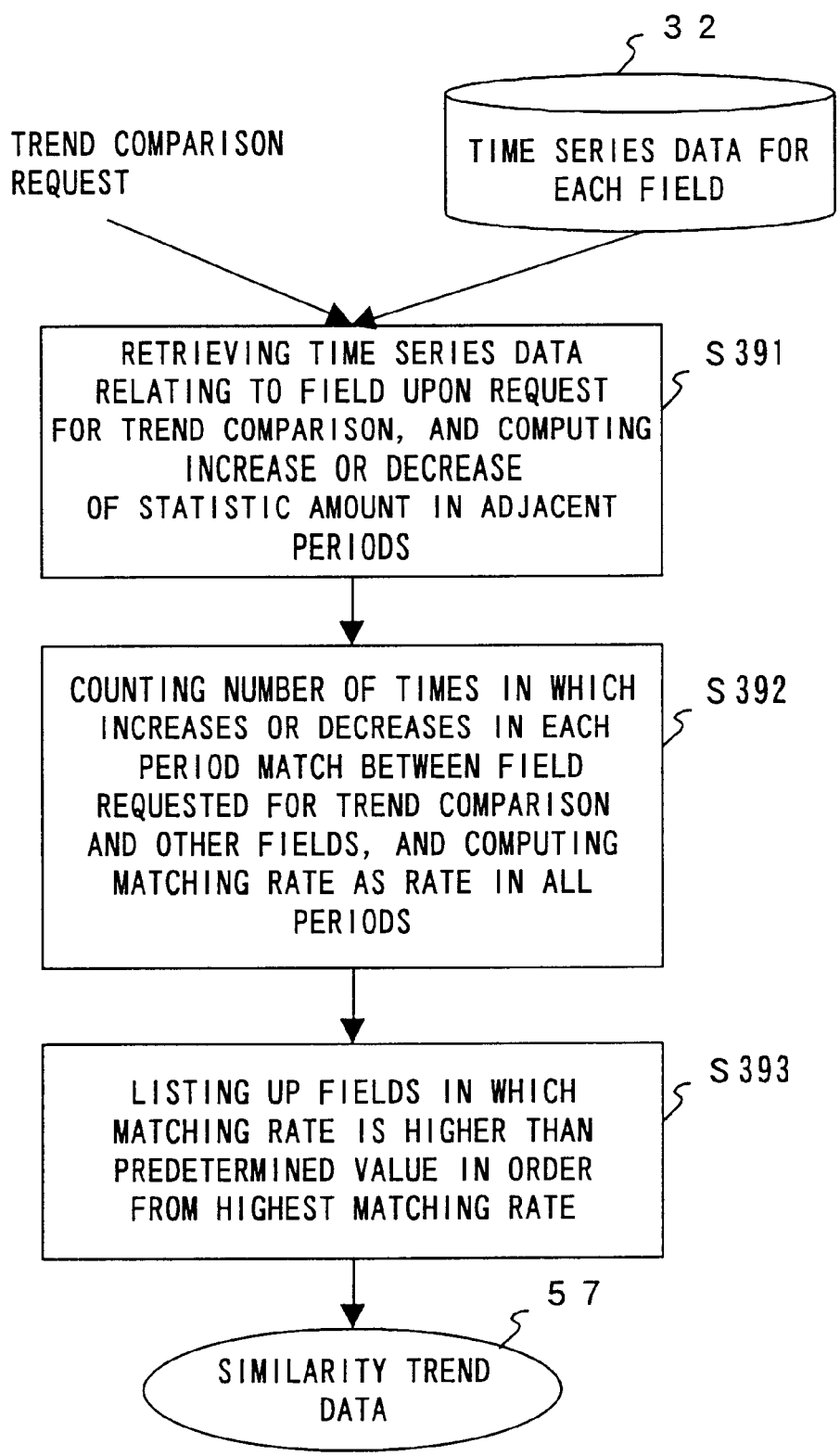
F I G. 39

5 7 SIMILARITY TREND DATA

| FIELD NAME | SIMILARITY |
|---|---|
| FIELD NAME 1 | SIMILARITY 1 |
| FIELD NAME 2 | SIMILARITY 2 |
| ... | ... |

F I G. 4 0

| DOCUMENT ID | CONTENTS OF DOCUMENT |
|---|---|
| 980720-0001 | <ISSUE DATE> JULY 20, 1998</ISSUE DATE><HEADER> OVER 100 PEOPLE DIED OF HEAT</HEADER><CONTENTS OF ARTICLE> AS OF 19th, NUMBER OF THE DEAD RECORD-BREAKING HEAT .... </CONTENTS OF ARTICLE> |
| 980720-0008 | <ISSUE DATE> JULY 20, 1998</ISSUE DATE><HEADER> DESTRUCTION IN THE MINE </HEADER><CONTENTS OF ARTICLE> DESTRUCTION IN MAGNESIUM MINE ON 17th IN RASHING, MIDDLE AUSTRIA ... </CONTENTS OF ARTICLE> |
| ... | ... |

F I G. 4 2

2 2 DATED DOCUMENT DATA

| DOCUMENT ID | DATE OF DOCUMENT (GENERATION DATE, DATE IN CONTENTS) |
|---|---|
| 980720-0001 | JULY 20, 1998,  JULY 19.1998 |
| 980720-0008 | JULY 20, 1998,  JULY 17.1998 |
| ... | ... |

F I G. 4 3 A

3 0 DOCUMENT CLASSIFICATION RESULT DATA

| DOCUMENT ID | DOCUMENT FIELD |
|---|---|
| 980720-0001 | ABNORMAL WEATHER, WEATHER |
| 980720-0008 | ACCIDENT, MINE |

F I G. 4 3 B

3 2 TIME SERIES DATA FOR EACH FIELD

| FIELD | PERIOD | NUMBER OF DOCUMENT |
|---|---|---|
| ... | ... | ... |
| ACCIDENT | JULY 20, 1997 | 5 |
| ACCIDENT | JULY 21, 1997 | 2 |
| ACCIDENT | JULY 22, 1997 | 2 |
| ... | ... | ... |

F I G. 4 3 C

| FIELD | PERIOD | NUMBER OF DOCUMENTS |
|---|---|---|
| AIRCRAFT ACCIDENT | JULY 1996 | AIRCRAFT ACCIDENT SEARCH COMMITTEE OF THE MINISTRY OF TRANSPORT(28), INDONESIAN AIRCRAFT ON FIRE(13), MAXIMUM COMPENSATION AMOUNT(8), AIRCRAFT ACCIDENT SEARCH COMMITTEE(6), VOICE RECORDER(5), FLIGHT RECORDER(4), VOICE RECORDER ANALYSIS(4), TAKE-OFF DECISIVE SPEED(4), VOICE RECORDER IN PILOT ROOM(3), JOINT SEARCH COMMITTEE(3) |
| AIRCRAFT ACCIDENT | AUGUST 1996 | CHINA AIRLINES (15), AIRCRAFT ACCIDENT SEARCH COMMITTEE OF THE MINISTRY OF TRANSPOST (12), AUTOMATIC CONTROL SYSTEM (8), FINAL REPORT DRAFT (6), JOINT PURSUERS (5), CHINA AIRLINES ACCIDENT SEARCH COMMITTEE ISSUES FINAL REPORT (4) CHINA AIRLINES CRASH ACCIDENT (4), ALPHA-FLOOR FUNCTION (4), CHINA AIRLINES ACCIDENT (4) |
| AIRCRAFT ACCIDENT | SEPTEMBER 1996 | AIRCRAFT ACCIDENT SEARCH COMMITTEE OF THE MINISTRY OF TRANSPORT (2), CHINA AIRLINES SIDE (2), CHINA AIRLINES (2), AUTOMATIC CONTROL DEVICE (2), REVISED WARSAW TREATY (2), CHINA AIRLINES CRASH ACCIDENT (2), WORLD AIRCRAFT ACCIDENTS (2), JOINT PURSURES (2), LEADER MAKOTO SUZUKI (2), PRESIDING JUDGE KUNIO AOYAMA (2), .... |
| ... | ... | ... |

F I G. 4 4

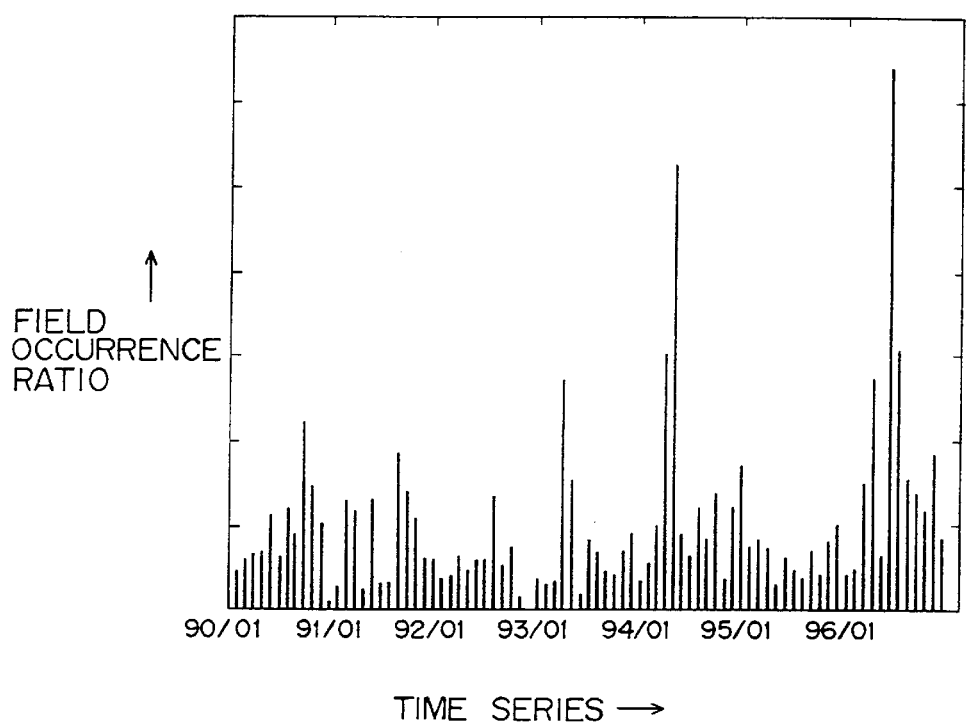
F I G. 45

| CHARACTERISTIC WORD OF 'AIRCRAFT ACCIDENT' FIELD (MAY IN 1994) | |
|---|---|
| CHARACTERISTIC WORD (PHRASE) | NUMBER OF OCCURRENCES |
| CHINA AIRLINES ACCIDENT | 23 |
| AIRCRAFT ACCIDENT SEARCH COMMITTEE OF THE MINISTRY OF TRANSPORT | 23 |
| CHINA AIRLINES CRASH ACCIDENT | 16 |
| CHINA AIRLINES | 15 |
| AUTOMATIC CONTROL DEVICE | 11 |
| RETRIAL OF TAKE-OFF | 10 |
| FRIGHT DATA RECORDER | 10 |
| CHINA AIRLINES NAGOYA BRANCH | 4 |
| CHINA AIRLINES CRASH AND FIRE ACCIDENT | 4 |
| CHINA AIRLINES ACCIDENTS | 4 |

FIG. 47A

| CHARACTERISTIC WORD OF 'AIRCRAFT ACCIDENT' FIELD (MAY IN 1994) | |
|---|---|
| CHARACTERISTIC WORD (PHRASE) | NUMBER OF OCCURRENCES |
| CHINA AIRLINES ACCIDENT | 23 |
| AIRCRAFT ACCIDENT SEARCH COMMITTEE OF THE MINISTRY OF TRANSPORT | 23 |
| CHINA AIRLINES CRASH ACCIDENT | 16 |
| CHINA AIRLINES | 15 |
| AUTOMATIC CONTROL DEVICE | 11 |
| RETRIAL OF TAKE-OFF | 10 |
| FRIGHT DATA RECORDER | 10 |
| CHINA AIRLINES NAGOYA BRANCH | 4 |
| CHINA AIRLINES CRASH AND FIRE ACCIDENT | 4 |
| CHINA AIRLINES ACCIDENTS | 4 |

FIG. 47B

MAY IN 1994 (CHARACTERISTIC WORD=CHINA AIRLINES CRASH ACCIDENT)

RETRIAL OF TAKE-OFF STARTED AT OVER-ALTITUDE? — INTERMEDIATE
REPORT OF AIRCRAFT ACCIDENT SEARCH COMMITTEE. 19940501

AIRCRAFT ACCIDENT SEARCH COMMITTEE OF THE MINISTRY OF TRANSPORT
(WITH CHAIRMAN KAZUYUKI TAKEUCHI) PUBLISHED AN INTERMEDIATE REPORT
ON CHINA AIRLINES CRASH ACCIDENT AT NAGOYA AIRPORT AFTER ANALYZING
THE VOICE RECORDER(CVR)ON 30th. ACCORDING TO THE RECORD OF THE CVR,
THE ASSISTANT PILOT SO(26) OPERATED THE CONTROL OF THE AIRCRAFT
UNTIL IMMEDIATELY BEFORE THE CRASH, AND THE CAPTAIN OH(42)
INSTRUCTED HIM TO RETRY THE TAKE-OFF.   FROM THE RECORDED
CONVERSATION INCLUDING "TOO HIGE", IT IS ASSUMED THAT
THE RETRY WAS MADE AT A TOO HIGH ALTITUDE, AND THE AIRCRAFT
COULD NOT PRODUCE SUFFICIENT OUTPUT, AND LOST ITS SPEED. ...

ACCIDENT SEARCH COMMITTEE TERMINATED — CHINA AIRLINE CRASH
AND FIRE ACCIDENT 19940501

RELATING TO THE CHINA AIRLINE CRASH AND FIRE ACCIDENT,
THE AIRCRAFT ACCIDENT SEARCH COMMITTEE OF THE MINISTRY OF TRANSPORT
TERMINATED THEIR FIELD SEARCH AND VERIFICATION AT NAGOYA AIRPORT
ON THE 30th. ...

CHINA AIRLINES CRASH ACCIDENT AT NAGOYA AIRPORT-DESTROYED
AIRCRAFT PARTS GATHERED UP — AVOIDED POLLUTION TO WATER FOR
AGRICULTURE 19940502

IN THE MORNING ON 2nd, POLICE OFFICE OF AICHI PREFECTURE
GATHERED UP THE AIRCRAFT PARTS AND OTHER ARTICLES DESTROYED AND
FELL INTO THE AGRICULTURAL WATER PASSING THROUGH NAGOYA AIRPORT.
THERE HAS BEEN A WORRY ABOUT THE POLLUTION BY A LARGE AMOUNT OF
THE FUEL LEAKING OUT OF A PART OF THE DESTROYED AIRCRAFT
INTO THE WATER FOR AGRICULTURE. ...

A WEEK PASSED WITH MISTERY OF 'UNCONTROLLABLE' CHINA AIRLINES
CRASH ACCIDENT— WHAT WAS TO BE 'PUSHED' OR 'CONNECTED'? 19940503

A WEEK HAS PASSED SINCE THE CHINA AIRLINE CRASH AND FIRE ACCIDENT
AT NAGOYA AIRPORT LOST THE LIVES OF TWO HUNDRED AND SIXTY FOUR
PASSENGERS. HOWEVER, THERE HAVE BEEN PROBLEMS UNSOLVED ABOUT
WHAT MADE THE AIRCRAFT UNCONTROLLABLE, WHAT SERIOUS FAULT OCCURRED,
ETC. THE RECORDED WORDS 'CONNECT' AND 'PUSH' IN THE CONVERSATION
'CONNECT IT', 'CANNOT PUSH IT', ETC. CANNOT BE CLEARLY INTERPRETED,
AND HAVE CONFUSED THE PERSONS IN SEARCH OF THE ACCIDENT.

(OMITTED HEREAFTER)

FIG. 48

MAY IN 1994 (CHARACTERISTIC WORD=CHINA AIRLINES CRASH ACCIDENT)

RETRIAL OF TAKE-OFF STARTED AT OVER-ALTITUDE? — INTERMEDIATE REPORT OF AIRCRAFT ACCIDENT SEARCH COMMITTEE. 19940501

AIRCRAFT ACCIDENT SEARCH COMMITTEE OF THE MINISTRY OF TRANSPORT (WITH CHAIRMAN KAZUYUKI TAKEUCHI) PUBLISHED AN INTERMEDIATE REPORT ON CHINA AIRLINES CRASH ACCIDENT AT NAGOYA AIRPORT AFTER ANALYZING THE VOICE RECORDER(CVR)ON 30th. ACCORDING TO THE RECORD OF THE CVR, THE ASSISTANT PILOT SO(26) OPERATED THE CONTROL OF THE AIRCRAFT UNTIL IMMEDIATELY BEFORE THE CRASH, AND THE CAPTAIN OH(42) INSTRUCTED HIM TO RETRY THE TAKE-OFF.   FROM THE RECORDED CONVERSATION INCLUDING "TOO HIGE", IT IS ASSUMED THAT THE RETRY WAS MADE AT A TOO HIGH ALTITUDE, AND THE AIRCRAFT COULD NOT PRODUCE SUFFICIENT OUTPUT, AND LOST ITS SPEED. ···

ACCIDENT SEARCH COMMITTEE TERMINATED — CHINA AIRLINE CRASH AND FIRE ACCIDENT 19940501

RELATING TO THE CHINA AIRLINE CRASH AND FIRE ACCIDENT, THE AIRCRAFT ACCIDENT SEARCH COMMITTEE OF THE MINISTRY OF TRANSPORT TERMINATED THEIR FIELD SEARCH AND VERIFICATION AT NAGOYA AIRPORT ON THE 30th. ···

CHINA AIRLINES CRASH ACCIDENT AT NAGOYA AIRPORT-DESTROYED AIRCRAFT PARTS GATHERED UP — AVOIDED POLLUTION TO WATER FOR AGRICULTURE 19940502 

IN THE MORNING ON 2nd, POLICE OFFICE OF AICHI PREFECTURE GATHERED UP THE AIRCRAFT PARTS AND OTHER ARTICLES DESTROYED AND FELL INTO THE AGRICULTURAL WATER PASSING THROUGH NAGOYA AIRPORT. THERE HAS BEEN A WORRY ABOUT THE POLLUTION BY A LARGE AMOUNT OF THE FUEL LEAKING OUT OF A PART OF THE DESTROYED AIRCRAFT INTO THE WATER FOR AGRICULTURE. ···

A WEEK PASSED WITH MISTERY OF 'UNCONTROLLABLE' CHINA AIRLINES CRASH ACCIDENT— WHAT WAS TO BE 'PUSHED' OR 'CONNECTED'? 19940503

A WEEK HAS PASSED SINCE THE CHINA AIRLINE CRASH AND FIRE ACCIDENT AT NAGOYA AIRPORT LOST THE LIVES OF TWO HUNDRED AND SIXTY FOUR PASSENGERS. HOWEVER, THERE HAVE BEEN PROBLEMS UNSOLVED ABOUT WHAT MADE THE AIRCRAFT UNCONTROLLABLE, WHAT SERIOUS FAULT OCCURRED, ETC. THE RECORDED WORDS 'CONNECT' AND 'PUSH' IN THE CONVERSATION 'CONNECT IT', 'CANNOT PUSH IT', ETC. CANNOT BE CLEARLY INTERPRETED, AND HAVE CONFUSED THE PERSONS IN SEARCH OF THE ACCIDENT.

(OMITTED HEREAFTER)

FIG. 49

DATE    MAY 2, 1994
ARTICLE    ID940502-2093

---

CHINA AIRLINES CRASH ACCIDENT, DESTROYED PARTS OF CRAFT
GATHERED UP AT NAGOYA AIRPORT WITH POLLUTION OF WATER
FOR AGRICULTURE AVOIDED

IN THE MORNING ON MAY 2, AICHI POLICE OFFICE SEARCH GROUP
GATHERED UP THE DESTROYED PARTS OF THE AIRCRAFT OF THE CHINA
AIRLINES FROM THE AGRICULTURAL WATER FLOWING THROUGH THE AIRPORT.
   THERE HAS BEEN A WORRY ABOUT THE POLLUTION OF WATER FOR
AGRICULTURE BY A LARGE AMOUNT OF THE FUEL LEAKING OUT OF A PART
OF THE CRAFT, AND THE PROBLEM WITH A METROPOLITAN AIRPORT
COMPLICATEDLY DESIGNED AS HAVING THE ADJACENT AREA OF THE AIR
SELF-DEFENSE FORCE AND THE AGRICULTURAL WATER FLOWING THROUGH
THE AIRPORT ETC.

(COMITTED HEREAFTER)

FIG. 50

28 DOCUMENT CLUSTERING RESULT DATA

| CLUSTER NAME | TEXT OF BODY |
|---|---|
| c 00001 | 950401-2099 |
| c 00001 | 950401-2153 |
| c 00001 | 950401-2153 |
| c 00001 | 950401-2165 |
| c 00001 | 950401-2234 |
| c 00002 | 950401-2219 |
| c 00002 | 950401-2356 |
| c 00002 | 950401-2190 |
| c 00002 | 950401-2218 |
| c 00002 | 950401-2201 |
| c 00002 | 950401-2346 |
| ... | ... |
| ... | ... |

F I G. 5 1

| WORD | NUMBER OF OCCURRENCES |
|---|---|
| JR | 18 |
| SEISMIC DISASTER | 10 |
| JAPANE | 6 |
| TRAIN | 6 |
| OSAKA | 6 |
| PASSENGERS | 6 |
| OVERHEAD BRIDGE | 6 |
| KABUTOMICHI STATION | 6 |
| INSPECTION | 6 |
| COMPANY | 6 |
| THE COMPANY | 5 |
| PERSON | 5 |
| SHIN-OSAKA | 5 |
| SANYO-SINKANSEN | 5 |
| HANSHIN | 5 |
| HOME | 5 |
| ... | ... |

FIG. 52

| PERIOD | 'POLITICAL ETHICS' FIELD | 'DIET' FIELD | 'EARTHQUAKE' FIELD |
|---|---|---|---|
| 90-91 | INCREASE | INCREASE | INCREASE |
| 91-92 | INCREASE | INCREASE | DECREASE |
| 92-93 | INCREASE | INCREASE | INCREASE |
| 93-94 | DECREASE | DECREASE | DECREASE |
| 94-95 | DECREASE | DECREASE | INCREASE |
| 95-96 | INCREASE | INCREASE | DECREASE |
| MATCHING RATE | — | 100% | 67% |

F I G. 5 6 A

LIST OF SIMILAR FIELD OF THE 'POLITICAL ETHICS'

| FIELD NAME | MATCHING RATE |
|---|---|
| POLITICS | 1 0 0 |
| DIET | 1 0 0 |
| POLITICAL INNOVATION | 8 3 |
| ... | ... |

| DOCUMENT ID | ACCESS TIME | OCCUPATION | ADDRESS | AGE | INTEREST |
|---|---|---|---|---|---|
| 980719-00001 | 1997/9/11 | ENGINEER | KANAGAWA PREF. ... | 29 | SOFTWARE, LAN, ... |
| 980733-00013 | 1997/10/10 | ENGINEER | KANAGAWA PREF. ... | 29 | SOFTWARE, OS, ... |
| ... | ... | ... | ... | ... | ... |

FIG. 58B

| DOCUMENT ID | ACCESS TIME | OCCUPATION | ADDRESS | AGE | INTEREST | USER ID |
|---|---|---|---|---|---|---|
| 980719-00004 | 1997/9/9 | PRESIDENT OF COMPANY | SHIZUOKA PREF. ... | 38 | STOCK MARKET, EXCHANGE, ... | |
| 980719-00012 | 1997/9/10 | PRESIDENT OF COMPANY | SHIZUOKA PREF. ... | 38 | STOCK MARKET, EXCHANGE, ... | |
| ... | ... | ... | ... | ... | ... | |
| 980719-00001 | 1997/9/11 | ENGINEER | KANAGAWA PREF. ... | 29 | SOFTWARE, LAN, ... | ← HISTORY OF USER A |
| 980720-00013 | 1997/10/10 | ENGINEER | KANAGAWA PREF. ... | 29 | SOFTWARE, OS, ... | ← HISTORY OF USER A |
| ... | ... | ... | ... | ... | ... | |

| DOCUMENT ID | ACCESS TIME | OCCUPATION | ADDRESS | AGE | OCCUPATION |
|---|---|---|---|---|---|
| 9807l9-00003 | 1997/9/10 | ENGINEER | TOKYO ⋯ | 20 | ROBOT, ⋯ |
| 9807l9-00032 | 1997/9/11 | ENGINEER | SHIZUOKA PREF. ⋯ | 38 | RADIO, COMMUNICATION, ⋯ |
| ⋮ | ⋮ | ⋮ | ⋮ | ⋮ | ⋮ |
| 9807l9-00003 | 1997/10/10 | ENGINEER | KANAGAWA PREF. ⋯ | 29 | SOFTWARE, LAN, ⋯ |
| ⋮ | ⋮ | ⋮ | ⋮ | ⋮ | ⋮ |

F I G. 5 9

| PERIOD | REFERENCE RATIO |
|---|---|
| FEBRUARY IN 1998 | 2 % |
| MARCH IN 1998 | 4 % |
| APRIL IN 1998 | 3 % |
| MAY IN 1998 | 6 % |
| JUNE IN 1998 | 1 % |
| ... | ... |

FIG. 60

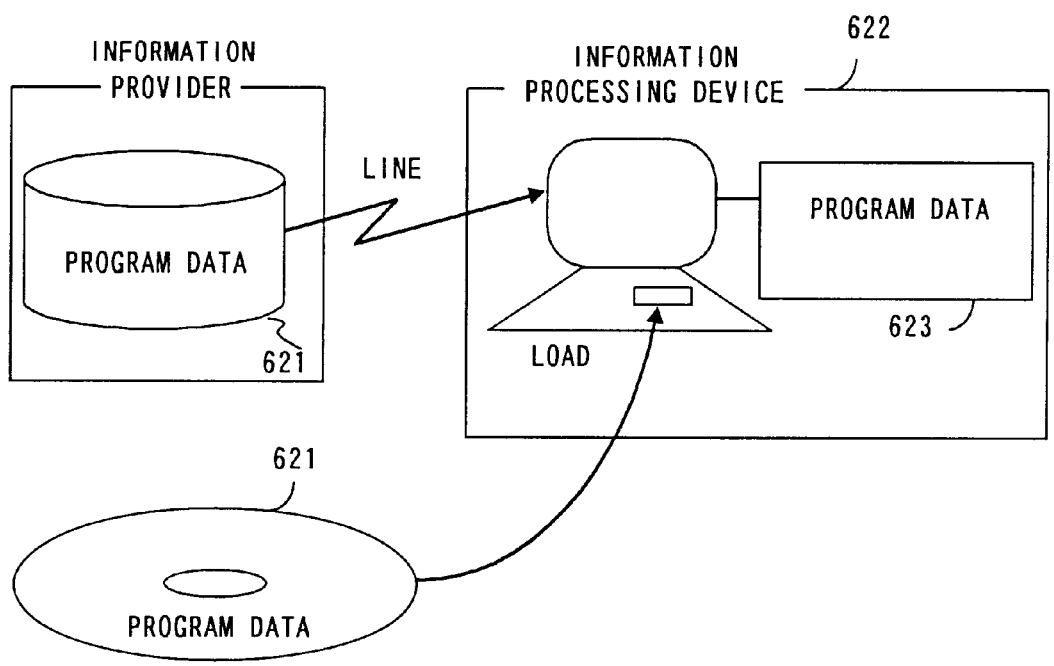
F I G. 6 2

APPARATUS AND METHOD FOR PRESENTING DOCUMENT DATA

BACKGROUND OF THE INVENTION

1. Field of the Invention

The present invention relates to a document data presentation apparatus, a document data presentation system, a document data presenting method, and a storage medium for storing a program of presenting document data.

2. Description of the Related Art

There has been a document data presentation apparatus for retrieving document data requested by a user from a large volume of document data, and for presenting the user with the retrieved data. The document data presentation apparatus of this type normally retrieves a document using a keyword. However, with an increasing volume of document data for a long period, it becomes difficult for a user to set an appropriate keyword when the user retrieves document data stored in a traditional search system a long time ago. In addition, since the terminology in documents changes with time, it is necessary to assume the old terminology when the use retrieves document data. Thus, there has been the problem that the user should be experienced in retrieving document data, that is, the retrieving process is rather difficult.

SUMMARY OF THE INVENTION

To solve the above described problem with the keyword retrieval, there have been such methods suggested as quantitatively computing and displaying the features of document data. For example, the amount of a document is computed for each predetermined period, and changes in features of the document data are displayed in time series.

However, from a change in the amount of a document, the user can understand that something has changed at a specific time in a specific field, but the user cannot be informed of what has happened in the field, or cannot obtain the information referring to the articles, etc. describing a corresponding affair that has happened in the field. Therefore, those methods do not sufficiently work in presenting necessary document data.

The present invention aims at presenting a user with document data having common features from among a large volume of document data. Another object of the present invention is to associate the classification based on an automatic text clustering process with a conventional well-known classification according to the similarity between the document data classified in the automatic clustering process, etc. and preliminarily classified document data. A further object of the present invention is to classify document data according to features of a user or a group of user. In addition, the present invention aims at displaying time series changes in statistic, information about document data, etc. classified based on features of a user or a group of user.

The document data presentation apparatus according to the present invention includes a text classification unit for classifying plural pieces of document data into groups of respective fields, and a feature information extraction unit for extracting feature information from a set of document data belonging to the same field and having generation dates of the document data or indicating dates in the document data within a predetermined period.

According to the present invention, a user can be presented with characteristic words (phrases) information for use in detecting document data having common features in the same field within a predetermined period from a large volume of document data. Thus, according to the characteristic information, the user can roughly specify a group of document data to be referred to, and efficiently find desired document data.

Furthermore, the document data presentation apparatus according to the present invention includes a text classification unit for classifying plural pieces of document data into groups of respective fields; a characteristic words information extraction unit for extracting characteristic words and the statistic information about the characteristic words information from a set of document data belonging to the same field and having generation dates of the document data or indicating dates in the document data within a predetermined period; a statistic information obtaining unit for obtaining the statistic information about a set of document data belonging to the same field in a predetermined period; and a display control unit for displaying the statistic information about a set of document data in a predetermined period as a time series trend graph, and for displaying, when any period of the time series trend graph is specified, the feature information or both feature information and statistic information about the feature information about the set of document data for the specified period.

According to the present invention, the statistic information about a set of document data in the same field and in a predetermined period, for example, the numbers of pieces of document data of respective periods are displayed as a time series trend graph. Therefore, according to the trend graph, the user can find the period in which the number of pieces of document data increases or decreases. In addition, since the feature information or both feature information and statistic information about the feature information about the document data in the period is displayed when the user specifies any period on the trend graph, the user can easily specify document data from the displayed information, thereby efficiently retrieving desired document data from a large volume of document data.

The feature information extraction unit obtains, for example, a characteristic word and the statistic information about the characteristic word from a set of document data in the same field in a predetermined period, and generates index data containing field information indicating a field, time information indicating a predetermined period, and a characteristic word.

The feature information extraction unit obtains, for example, the number of occurrences of a word in a set of document data in a predetermined period as statistic information as a characteristic word (phrases), and extracts a word (phrases) indicating a larger number of occurrences as a characteristic word (phrases).

A classification unit classifies document data into groups of respective fields by comparing the similarity between, for example, a preliminarily calculated field property vector of each field and a text property vector of the document data to be classified.

Thus, a large volume of document data stored for a long period can be classified into document data groups respectively having similar properties. In addition, since a user can be presented with a characteristic word (phrase) and statistic information such as the number of its occurrences, etc. from a set of document data in the same field in a predetermined period, thereby realizing a document data presentation apparatus capable of easily retrieving document data with high precision which cannot be performed by the conventional keyword retrieval, etc.

Furthermore, the document data presentation apparatus according to the present invention includes a user (or groups of users) document designation history information storage unit for storing user feature information about a user (or group of users) associated with document identification information indicating the document data referred to by the user (users); and a classification unit for classifying document data according to the user feature information about the user who has referred to the document data.

According to the present invention, since document data can be classified according to user feature which calculated by the documents accessed by the user (users) about a user, the user obtains the information such as a set of document data classified based on the same user feature as the feature of the user for use as reference in retrieval, thereby more efficiently performing the retrieval.

Furthermore, the document data presentation apparatus according to the present invention includes a user document designation history information storage unit for storing user feature information about a user associated with document identification information indicating the document data referred to by the user; a classification unit for classifying document data according to the user feature information about the user who has referred to the document data; a statistic information obtaining unit for obtaining the statistic information about a set of document data belonging to the same field in a predetermined period; and a display control unit for displaying the statistic information about a set of document data in a predetermined period as a time series trend graph.

Since the statistic information about a set of document data in the same field in a predetermined period classified according to user (users) property information is displayed as a time series trend graph according to the present invention, necessary document data can be efficiently found by retrieving the data after roughly specifying the document data in a period in which the volume of statistic information has increased.

In addition, for example, the quantitative transition of the accessed document data can be visually obtained by displaying the time series change of the number of pieces of document data accessed by a specific user and the time series change of the number of pieces of document data classified according to the user feature information indicating the feature of the user.

Furthermore, if a user specifies a period on the trend graph and displays the characteristic words information or both characteristic words information and statistic information about the characteristic words information about the document data in the specified period, then document data having the feature information shared by any data in the document data classified according to the user feature information indicating the same feature of the user can be easily retrieved.

BRIEF DESCRIPTION OF THE DRAWINGS

FIGS. 5A and 5B show document data 10, and the configuration of dated document data 22;

FIG. 7 shows the configuration of the field property vector generated based on the number of occurrences of a word;

FIG. 9 is a flowchart of the process of a document clustering unit 27;

FIG. 10 shows the configuration of document clustering result data;

FIG. 11 is a flowchart of the process of generating a field property vector from a result of a clustering process by the field property computation unit 23;

FIG. 13 is a flowchart of the contents of the process performed by a document classification unit 29;

FIG. 14 shows the configuration of document classification result data;

FIG. 15 is a flowchart of the contents of the process performed by a document amount aggregation unit 31;

FIG. 16 shows the configuration of time series data for each field;

FIG. 17 is a flowchart of the process of generating time series index data for each field performed by a characteristic word extraction unit 33;

FIG. 18 shows the configuration of time series index data for each field;

FIG. 24 shows a list of characteristic words in a field i in a period k;

FIG. 27 is a flowchart of the process of a document selection and detection unit 42;

FIG. 28 is a flowchart of the process of a document display unit 44;

FIGS. 30A and 30B show examples of a document list and a document display;

FIG. 31 is a flowchart of the process of a user feature storage unit 47;

FIG. 32 shows a user feature input form;

FIGS. 33A and 33B show the configuration of user feature data;

FIG. 34 is a flowchart of the process of a document designation history storage unit 49;

FIGS. 35A and 35B show the configuration of the document and specific user or all user feature history data;

FIG. 37 shows the configuration of other user comparison data;

FIG. 39 is a flowchart of the process of a trend feature comparison unit 56;

FIG. 40 shows the configuration of similar trend data;

FIG. 42 shows an example of document data;

FIGS. 43A, 43B, and 43C show examples of dated document data, document classification result data, and time series data for each field;

FIG. 44 shows an example of the number of documents for each filed and period;

FIG. 45 shows a trend graph of an aircraft accident field;

FIGS. 47A and 47B shows examples of displaying a characteristic word list;

FIG. 48 shows an example of displaying a document list;

FIG. 49 shows the display state entered when a document is selected from a document list;

FIG. 50 shows a document selected from a document list;

FIG. 51 shows an example of document cluster result data;

FIG. 52 shows the feature of the field of a cluster c00001;

FIGS. 56A and 56B show the increase/decrease on the trend graph, and the coincidence level on the graph;

FIGS. 58A and 58B show an example of specific user/all user character history data;

FIG. 59 shows an example of a set of engineer fields of user occupations;

FIG. 60 shows a referencing rate of a specific user for each period;

FIG. 62 shows a storage medium.

DESCRIPTION OF THE PREFERRED EMBODIMENTS

Figure 1:
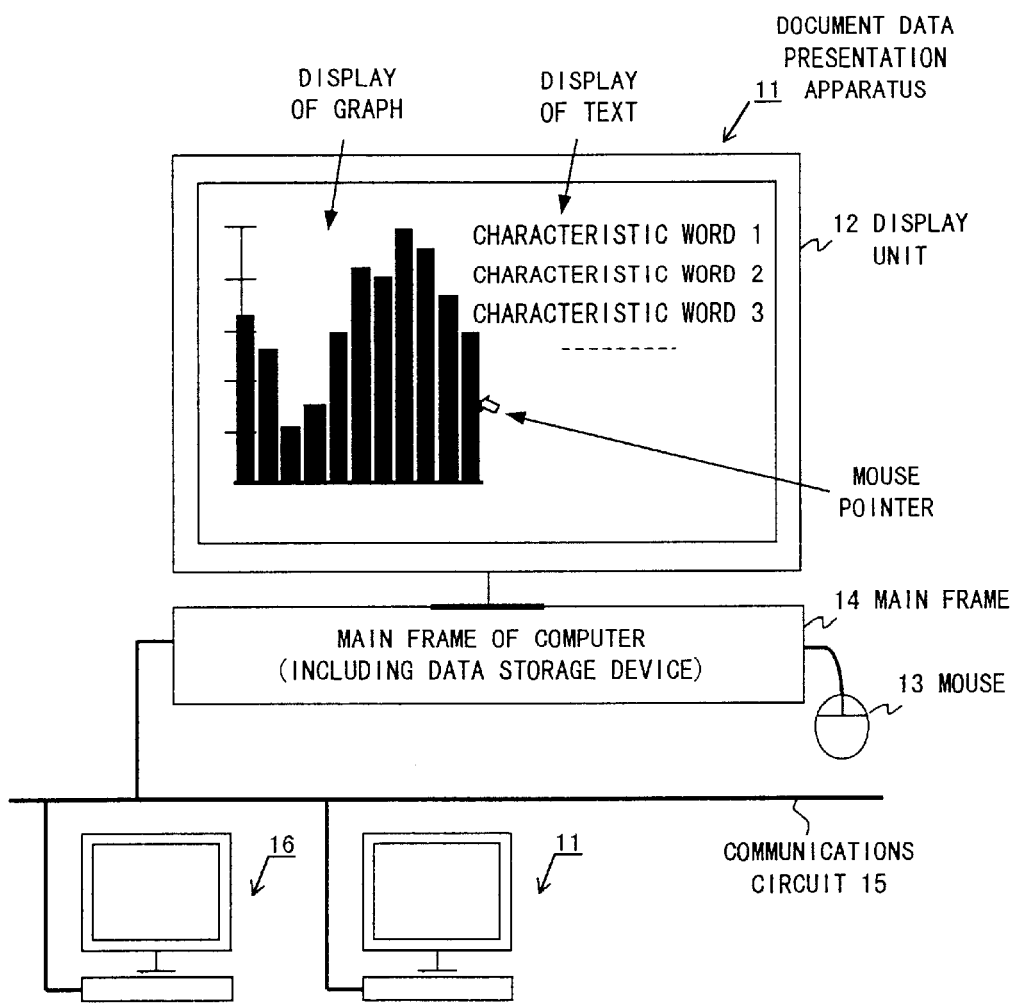
FIG. 1 shows the configuration of the document data presentation apparatus according to an embodiment of the present invention.

The preferred embodiment of the present invention is described below by referring to the attached drawings. FIG. 1 shows the configuration of the document data presentation system according to an embodiment of the present invention.

The document data presentation apparatus 11 comprises a display unit 12 for displaying text and graphs; a pointing unit 13 such as a mouse, etc. capable of selecting text on the screen and the position on the graph; and a main frame 14 containing a microprocessor, a storage device, etc. The document data presentation apparatus 11 is connected to a communications circuit 15 such as a LAN, etc. Other document data presentation apparatuses 11 or a display unit 16, etc. for displaying the information presented by the document data presentation apparatus 11 are connected to the communications circuit 15.

Software for presenting feature information, etc. of document data, displaying a time series trend graph, etc. can be stored in the document data presentation apparatus 11, or connected through the communications circuit 15 to another device which can be referred to from the document data presentation apparatus 11. Otherwise, document data or the data relating to the document data can be stored in another storage unit.

Figure 2:
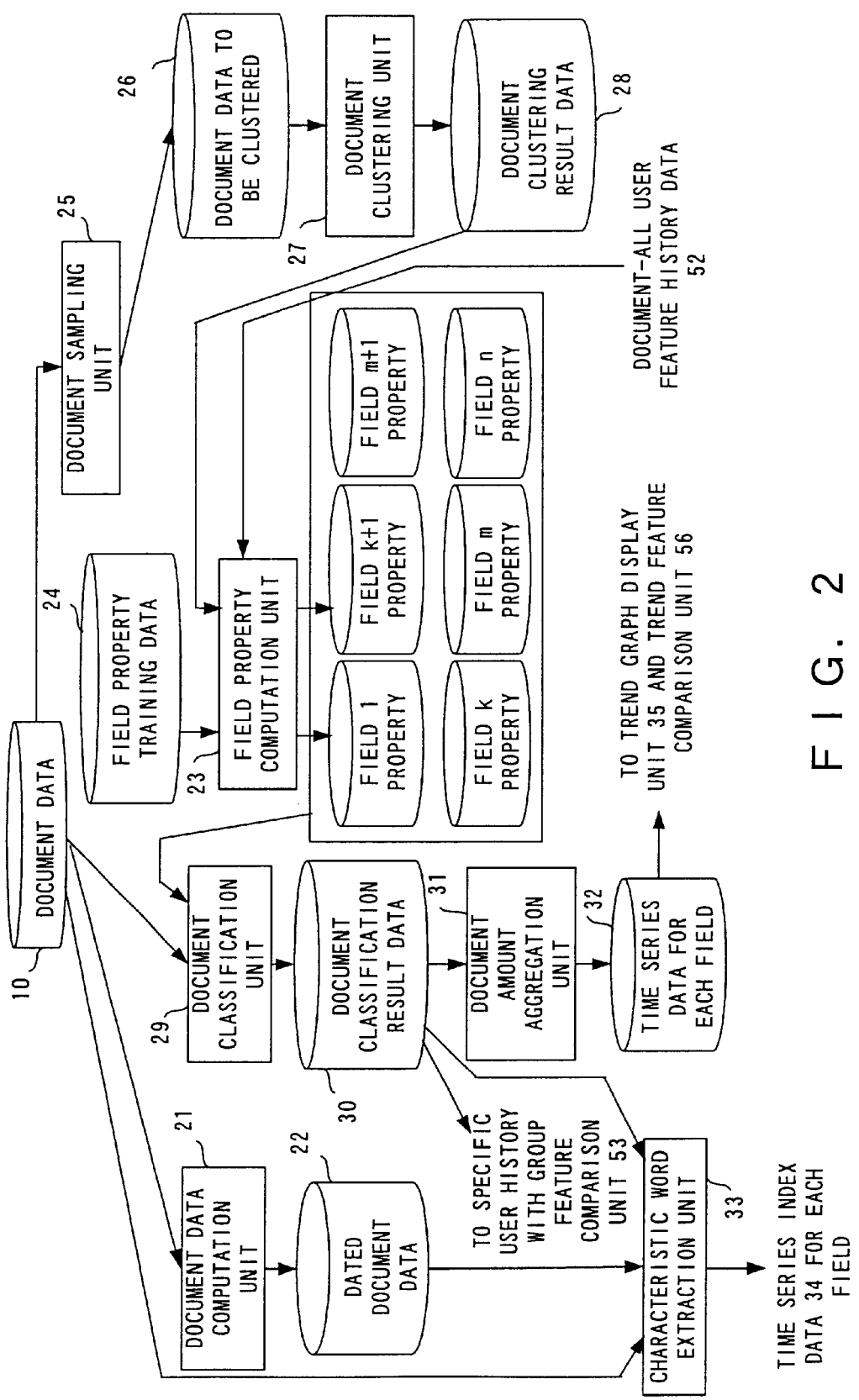
FIG. 2 is a block diagram (1) of a document data presentation apparatus 11.
Figure 3:
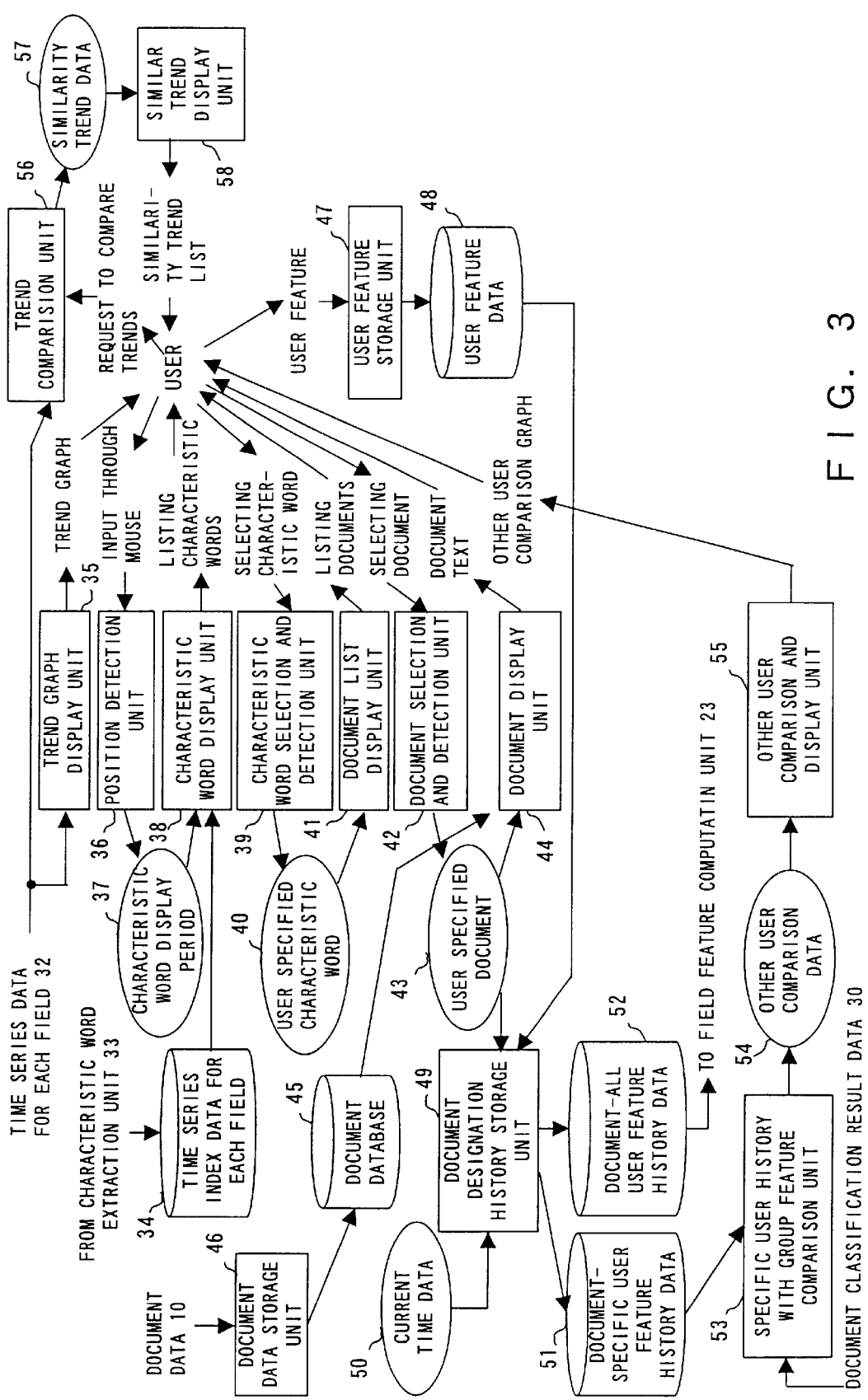
FIG. 3 is a block diagram (2) of a document data presentation apparatus 11.

FIGS. 2 and 3 are block diagrams of the document data presentation apparatus 11. The document date computation unit 21 extracts the generation date of the document data 10 (issue date if the document data refer to newspaper articles), and the date in the contents of the document data 10 (date of the item described in the document data), and generates dated document data 22 containing document identification information indicating the document data 10 and a document date (generation date and date of contents).

First, the process of generating the dated document data 22 by the document date computation unit 21 is described below by referring to the flowchart in FIG. 4.

Figure 4:
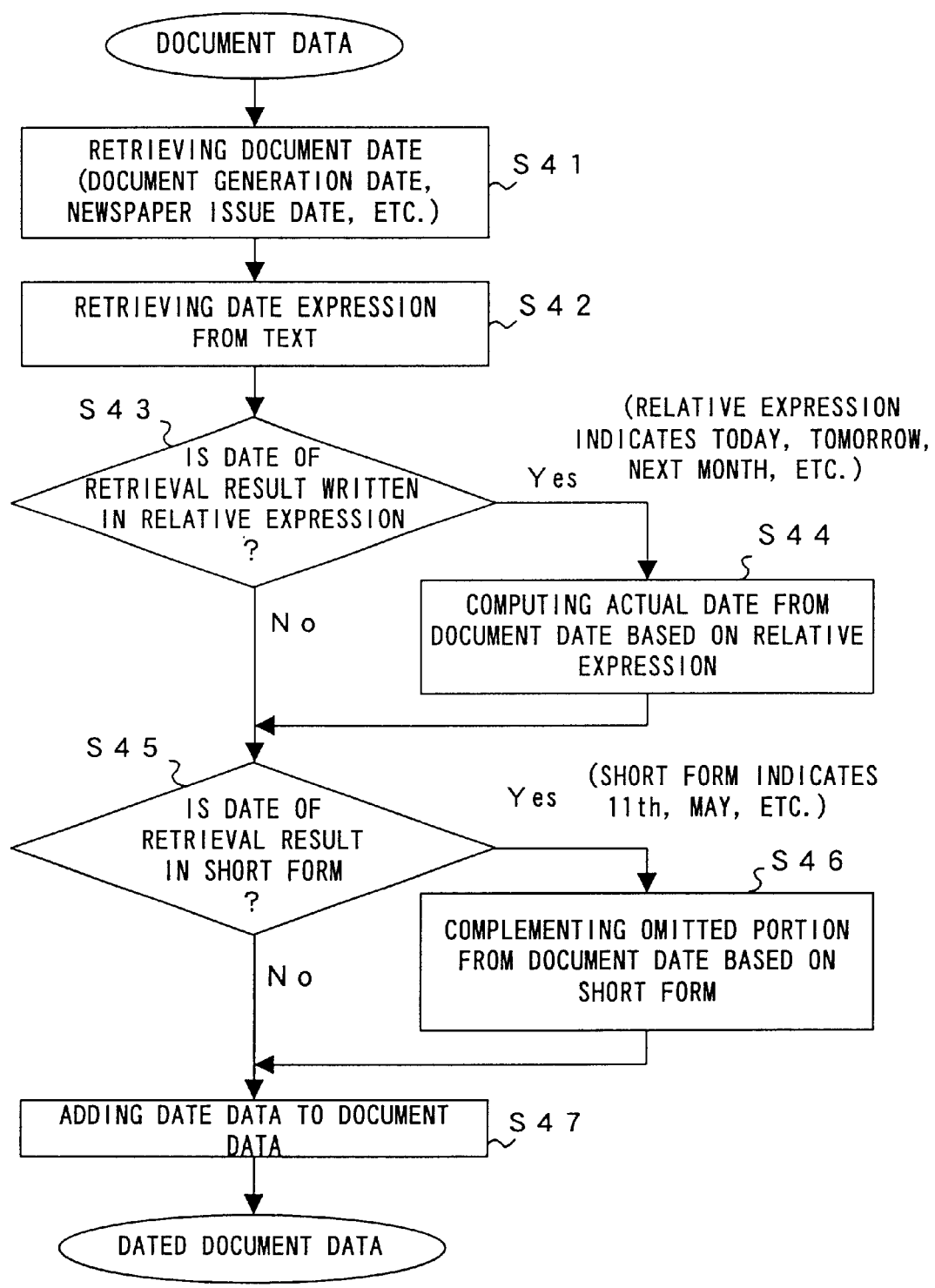
FIG. 4 is a flowchart of the contents of the process performed by a document date computation unit 21.

The generation date of the document data 10, for example, when the document data 10 refer to a newspaper article, the issue date of the newspaper is retrieved as a generation date (S41 in FIG. 4). Then, the date in the text of the document data 10 is retrieved (S42). Then, it is determined whether or not the date obtained through retrieval refers to relative representation such as today, tomorrow, next month, etc. (S43). If the date refers to the relative representation, then the actual date is computed from the generation date (S44).

If it is determined in step S43 that the date obtained through retrieval does not refer to relative representation, then control is passed to step S45, and it is determined whether or not the date is represented with the year, month, date, etc. omitted. If the date is expressed in a short form, then control is passed to step S46, and the complete date is generated by obtaining the omitted data from the generation date of the document or the issue date of the newspaper.

When a date in a relative expression such as today, tomorrow, etc. is converted into an absolute date, or when a date in a short form is amended into a complete form, the generation date and the date of contents are added to the document data 10, and the entire data is stored as the dated document data 22 (S47).

FIGS. 5A and 5B show the configuration of the dated document data 22 generated using the document data 10 by the document date computation unit 21.

The document data 10 is stored with a document ID associated with the contents of a document. The dated document data 22 is stored with a document ID associated with its generation date and the date in the contents.

Therefore, according to the generation date and the date in the contents of the dated document data 22, the generation date and the date in the contents of each piece of document data can be obtained.

Figure 6:
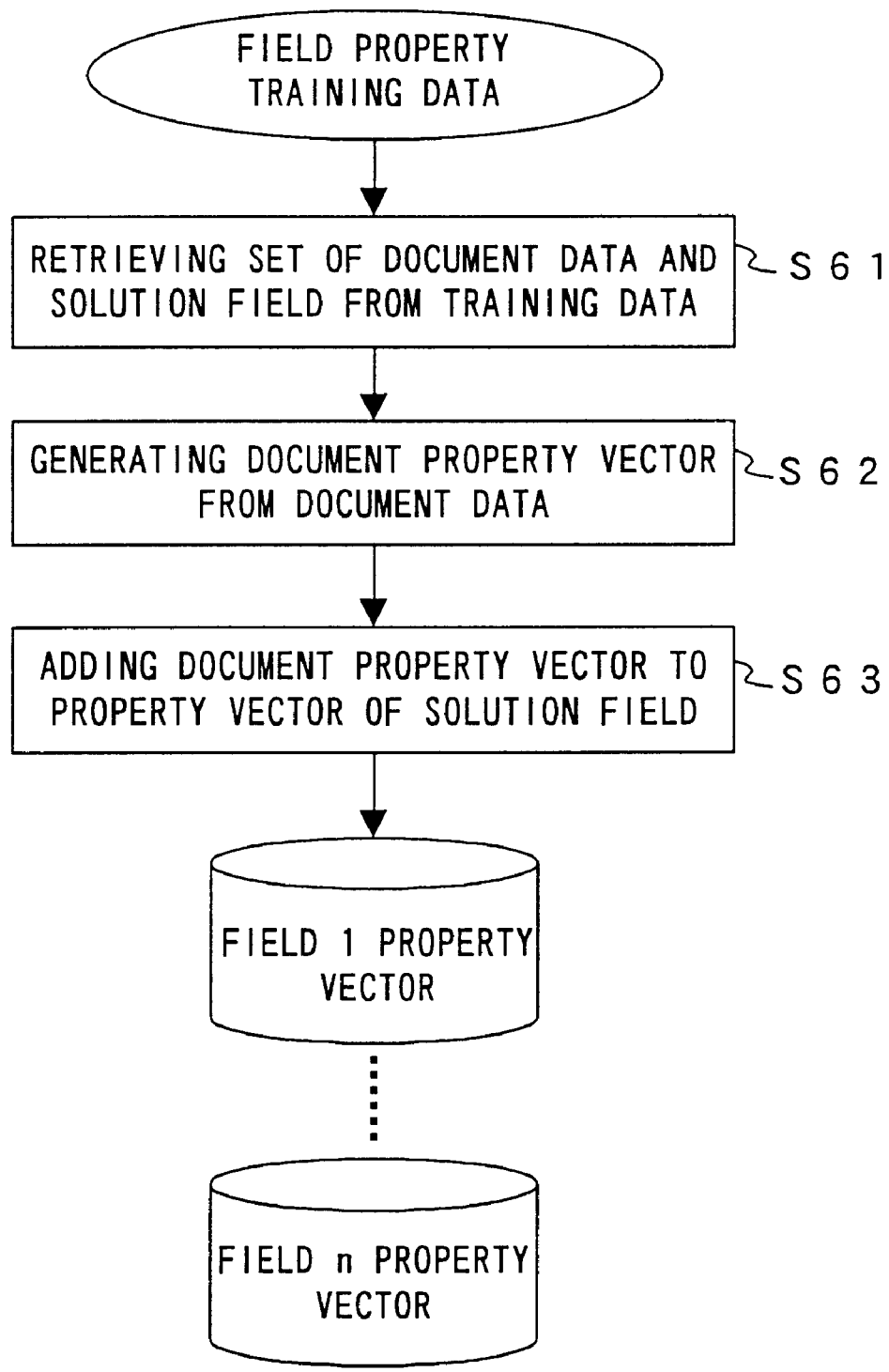
FIG. 6 is a flowchart of the process of generating a field property vector from training data by a field feature computation unit 23.

The process of generating a field property vector in the field feature computation unit 23 is described below by referring to the flowchart in FIG. 6.

According to the present embodiment, the following three method can be adopted.

(1) Computing the property for each field in a classification property computing process after preparing training document data definitely belonging to any field.

(2) Computing the property for each field in a classification property computing process after preliminarily obtaining a cluster in an automatic clustering process and processing the document data in a cluster of documents as a training set.

(3) Computing the property for each field in a classification property computing process after obtaining reference history information of a user about document data, classifying the document data based on a user feature, and using the document data referred to by the user as a training set.

Described first is the process of computing a field feature based on the training document data definitely belonging to any field described in (1) above.

The field property computation unit 23 retrieves from the training document data a set of the document data 10 from the training document data and the field information indicating the field to which the document data 10 belongs. Next, a document property vector is generated from the training document data (S62). Then, the document property vector is added to the field property vector of the corresponding field (S63).

A document property vector refers to a set of results obtained by computing the number of occurrences of a word in a document after dividing the document into words, and can be expressed as follows.

document property vector=(number of occurrences of a word 1 in a document, number of occurrences of a word 2 in a document, . . . , number of occurrences of a word n in a document)

A field property vector can be expressed as follows.

field property vector=(number of occurrences of a word 1 in a field, number of occurrences of a word 2 in a field, . . . , number of occurrences of a word n in a field)=document property vector belonging to a Σ field The similarity between the document property vector and the field property vector can be expressed by the following equation where ct indicates the element of a field property vector C of a word t, and dt indicates the element of a document property vector D of the word t in n words in a document data.

$$\text{Similarity} = \frac{\sum_{t=1}^{n} Ct \times dt}{\sqrt{\sum_{t=1}^{n} C_t^2 \sum_{t=1}^{n} d_t^2}}$$

FIG. 7 shows the configuration of the field property vector generated in the above described process. FIG. 7 shows a property vector of a field i comprising a set of a word in the document data 10 belonging to the field, and the number of occurrences of the word.

Figure 8:
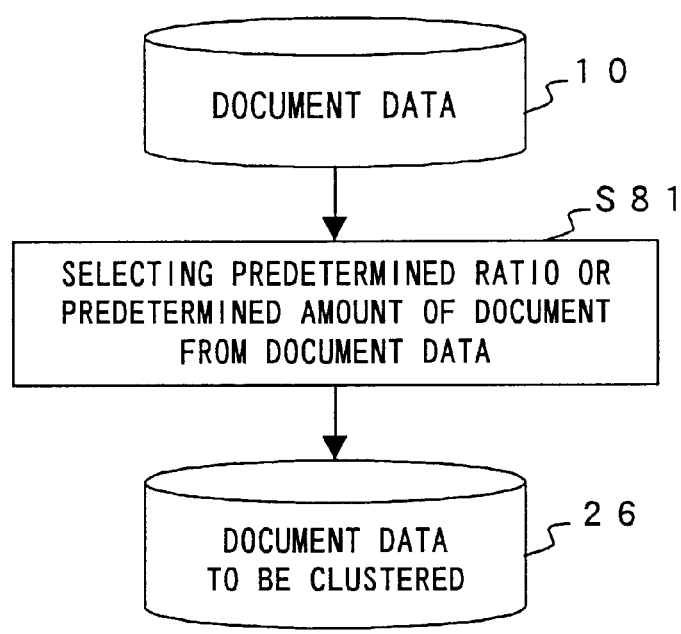
FIG. 8 is a flowchart of the process of a document sampling unit 25.

Next, the process of computing a field feature in an automatic clustering process is explained by referring to the flowcharts shown in FIGS. 8, 9, and 11.

First, the document data 10 is clustered as a pre-stage of extracting a field property in a clustering process.

In a clustering process, the similarity is obtained by quantitatively expressing the similarity of data, and classifying plural pieces of data having high similarity into one cluster. The clustering process is performed on the document data 10 according to the hierarchical clustering algorithm in the present embodiment.

The document sampling unit 25 selects a predetermined rate or a predetermined amount of the document data 10 from among plural sets of document data 10 in step S81 shown in FIG. 8, and defines the selected document data 10 as document data 26 to be clustered.

Next, the document clustering unit 27 converts the document data 26 to be clustered into a document property vector in step S91 shown in FIG. 9. Furthermore, it assigns a cluster ID to a document property vector to generate a cluster property vector (S92). Thus, a cluster ID is assigned to each piece of the document data 26 to be clustered, and a cluster is generated. Then, the similarity is computed in all clusters (S93), and clusters having high similarity are classified into one group (S94). The object number of clusters is predetermined, and it is determined whether or not the number of clusters has reached the object number (S95).

If the number of clusters is larger than the object number, then the processes in and after step S93 are performed, and clusters having high similarity are grouped to reduce the number of clusters down to the object number of clusters.

When the number of clusters matches the object number (YES in S95), the clustered document data is output as document clustering result data 28 to the field feature computation unit 23.

FIG. 10 shows the configuration of the document clustering result data 28 generated in the above described process.

The document clustering result data 28 comprises a set of a cluster name (cluster ID) and a document ID, and can check the correspondence between a predetermined number of clusters and the document data 10 belonging to the clusters.

The field property computation unit 23 obtains the document data 10 from a document ID corresponding to a cluster name in step S111 shown in FIG. 11 when the document clustering result data 28 is provided by the document clustering unit 27, thereby obtaining a set of the document data 10 and the cluster ID. Then, a document property vector is extracted from the document data 10 (S112). That is, a document property vector comprising a word in a document data and the number of occurrences of the word is generated for each cluster ID. Next, a field is generated for the cluster, and a document property vector of a corresponding cluster is added to a field property vector (S113). That is, a field is generated corresponding to a cluster, and the document property vector of the document data 10 belonging to each cluster is defined as the field property vector of each field.

Thus, a word contained in the document data 10 divided into clusters and the number of occurrences of the word are generated as a field property vector of a corresponding field.

Figure 12:
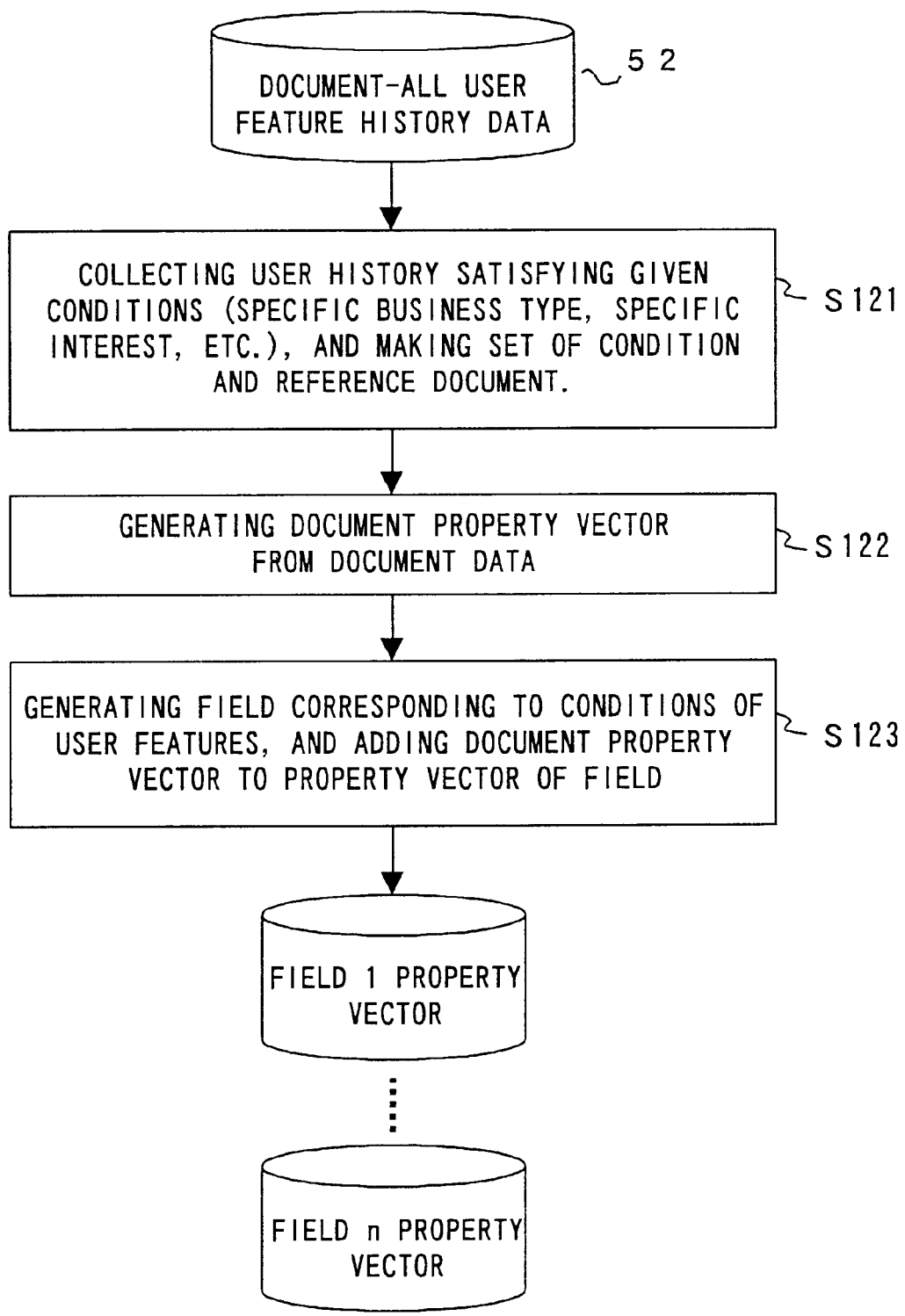
FIG. 12 is a flowchart of the process of generating a field property vector from a user history by the field property computation unit 23.

The process of generating a field feature from document-all user feature history data 52 is described by referring to the flowchart shown in FIG. 12.

The field property computation unit 23 collects user history data having user features satisfying predetermined conditions (specific business type, hobby, etc.) in step S121 shown in FIG. 11 when the document-all user feature history data 52 (described later) in which the user feature information about a plurality of users corresponds to the document ID, etc. of the document data referred to by the users is provided. Then, the field property computation unit 23 generates a set of data comprising the provided conditions and the document ID of the document data 10 referred to by the users corresponding to the conditions.

Next, a document property vector of the document data 10 referred to by users having similar user features is generated (S122). Then, a field corresponding to the conditions of the user features is generated, and the document property vector of a referred-to document is added to a field property vector of each field (S123).

Thus, the document property vector of the document data 10 referred to by a user corresponding to each of the preliminarily provided conditions is generated as a field property vector.

The process of classifying the document data 10 by the document classification unit 29 based on the field property vectors of the fields 1 through n shown in FIG. 2 when they have been generated is described by referring to the flowchart shown in FIG. 13.

First, in step S131 shown in FIG. 13, the document data 10 to be classified is converted into a document property vector. Then, the similarity between the document property vector of the document data 10 to be classified and the field property vector from the field 1 to the field n is computed (S132). Then, document classification result data 30 is generated by associating the document ID of the document data 10 to be classified with a field having high similarity with the document property vector of the document data 10 (S133).

FIG. 14 shows the configuration of the document classification result data 30 generated by the document classification unit 29.

As shown in FIG. 14, by the comparison between the field property vectors of predetermined fields 1 through n with the document property vector, the name of the field defined as having high similarity is associated with the document ID of the document data 10 to be classified.

Therefore, the field of the document data 10 can be obtained from the document ID of the document classification result data 30.

FIG. 15 is a flowchart of the process of the document amount aggregation unit 31 generating time series data 32 for each field by obtaining statistic information about a set of document data in the same field in a predetermined period, for example, the number of pieces of document data.

In step S151 shown in FIG. 15, a data set of a document ID, a document date and a field name is generated from the dated document data 22 generated by the document date computation unit 21 and the document classification result data 30 generated by the document classification unit 29. According to the data, the number of pieces of document data in a predetermined period in the same field is computed, and the time series data 32 for each field can be generated.

FIG. 16 shows the configuration of the time series data 32 for each field generated by the document amount aggregation unit 31.

As shown in FIG. 16, the time series data 32 for each field comprises sets of a field, an aggregation period and the number of pieces of document data. According to the time series data 32 for each field, the change with time in number of pieces of document data in the same field can be obtained.

The process of extracting the feature information (for example, a word) about the document data 10 in the same field and the statistic information (for example, the number of occurrences of a word weighted by the level of a characteristic word) relating to the feature information is described below by referring to the flowchart shown in FIG. 17.

The characteristic word extraction unit 33 retrieves the field corresponding to the document ID in the dated document data 22 from the document classification result data 30 in step S171 shown in FIG. 17, and generates data comprising sets of a document ID, a document date, and a field.

Then, it extracts a word from the document data 10 specified by the document ID, and generates data comprising sets of a word list, a document date, and a field (S172). The number of words is counted for each field and period to obtain the number of occurrences of the word (S173). Next, the obtained number of occurrences of the word is multiplied by a predetermined coefficient of the level of a characteristic word, and the result is defined as a statistic amount of the characteristic word (S174). Then, words are arranged in order from the largest statistic amount, and a predetermined number of words are extracted as characteristic words in a specific field and in a specific period. The characteristic word extracting process is performed for each period in each field, and a time series index data 34 for each field comprising a field name, period information indicating a period, and a characteristic word is generated (S175).

The characteristic word extraction unit 33 divides a newspaper article in a field Cj (j=0 through m) in a period Ti (I=j through n) into words in a compound word analyzing process, etc., obtains the statistic amount (statistic information) about each word, and extracts a necessary number of words in order from the largest statistic amount, thereby extracting a characteristic word. The statistic amount can be the number of occurrences of a word in the period Ti in the field Cj, or can be a characteristic word determination amount obtained by multiplying the number of occurrences by the level of a characteristic word of a word (for example, it is determined whether the word indicates the name of a case, person, etc.) as a weight.

FIG. 18 shows the configuration of the time series index data 34 for each field generated by the characteristic word extraction unit 33.

The time series index data 34 for each field comprises sets of a field, an aggregation period, and a predetermined number of characteristic words (including the statistic amount). According to the time series index data 34 for each field, a characteristic word in each period in a specific field, and the statistic amount of the characteristic word can be obtained.

Figure 19:
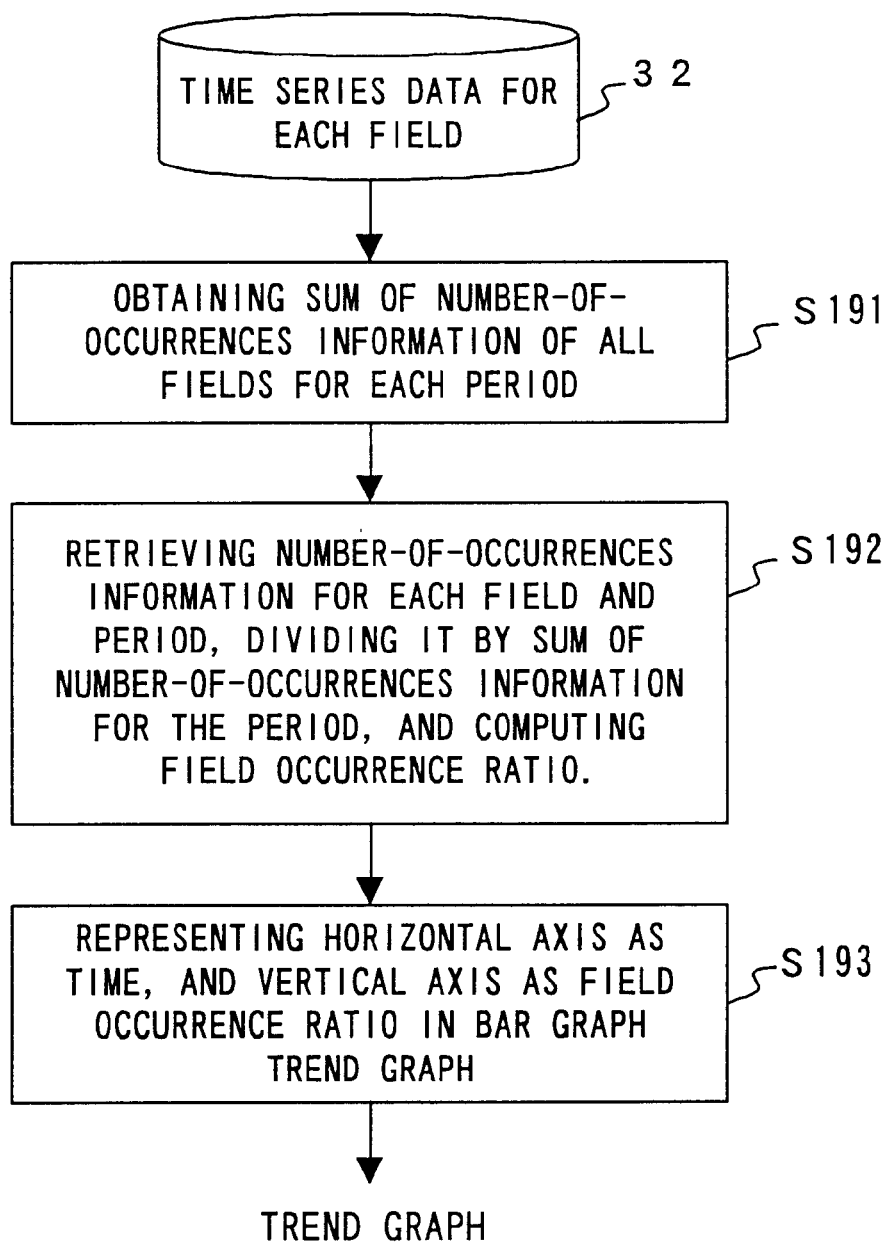
FIG. 19 is a flowchart of the process of a trend graph display unit 35.

The contents of the process of a trend graph display unit 35 displaying the change with time of the amount of a document feature according to the time series data 32 for each field are described by referring to the flowchart shown in FIG. 19.

First, in step S191 shown in FIG. 19, a sum of the number-of-occurrences information of all fields in each period, for example, a sum of the number of pieces of document data is obtained according to the time series data 32 for each field. In step S192, the number-of-occurrences information in each period and field, for example, the number of pieces of document data for each field is obtained, and the result is divided by a sum of the number of occurrences in all fields, thereby computing the occurrence rate for each field. In addition, a bar graph indicating the change with time of the occurrence rate is displayed. In the graph, the horizontal axis indicates the time, and the vertical axis indicates the occurrence rate in each field (S193).

For example, the number of pieces of document data in each period and field is obtained, the number of pieces of document data is divided by the number of pieces of document data of all fields in each period, and the result is displayed as a change with time of the occurrence rate of a document in a corresponding field.

The process of the position detection unit 36 detecting the position specified on the screen when the user specifies a specific period using a mouse, etc. with the field trend displayed is described below by referring to the flowchart shown in FIG. 20.

Figure 20:
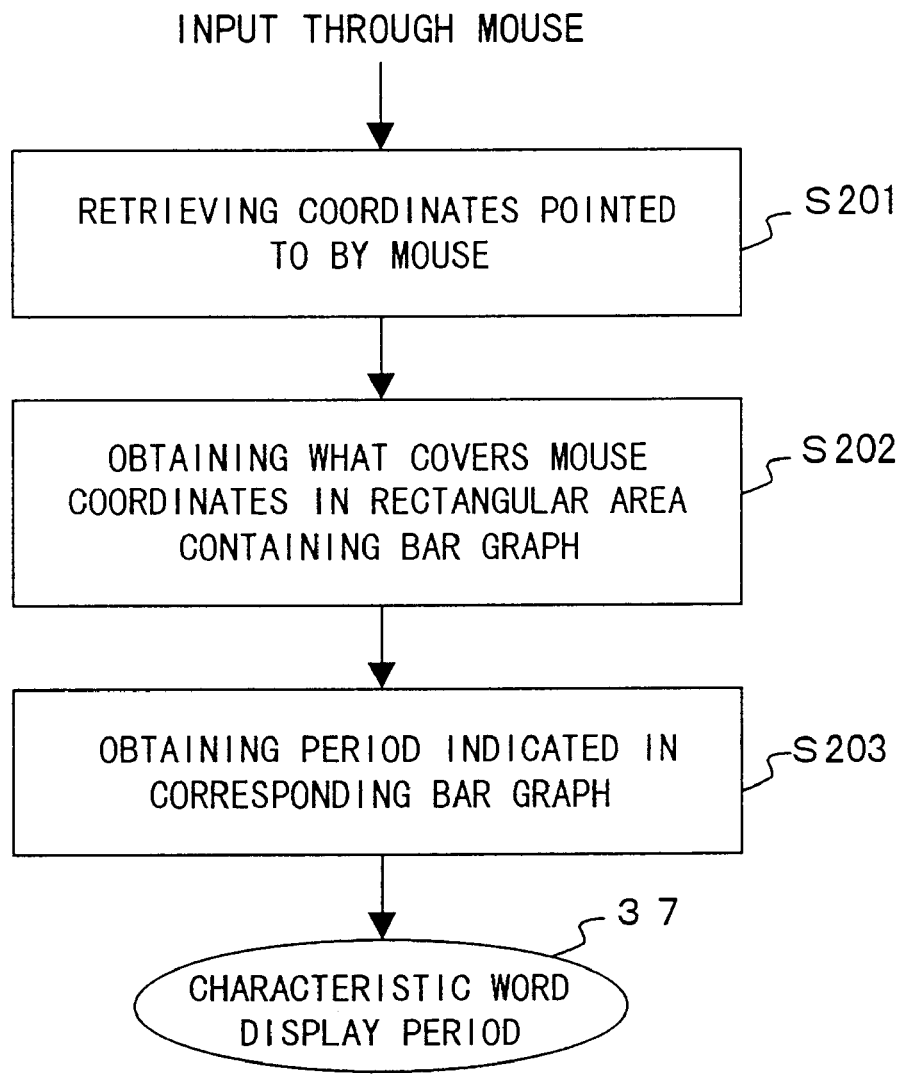
FIG. 20 is a flowchart of the process of a position detection unit 36.

When the mouse is clicked with any position on the screen pointed to, the coordinates of the specified position are computed in step S201 shown in FIG. 20. Obtained next is the area containing the coordinates specified by the mouse in the rectangular area containing the bar graph in the trend graph displayed by the display unit 12 (S202). Then, the aggregation period of the bar graph is obtained as a characteristic word display period 37 (S203).

Next, the contents of the process of the characteristic word display unit 38 displaying the characteristic word in the specified characteristic word display period 37 are described below by referring to the flowchart shown in FIG. 21.

Figure 21:
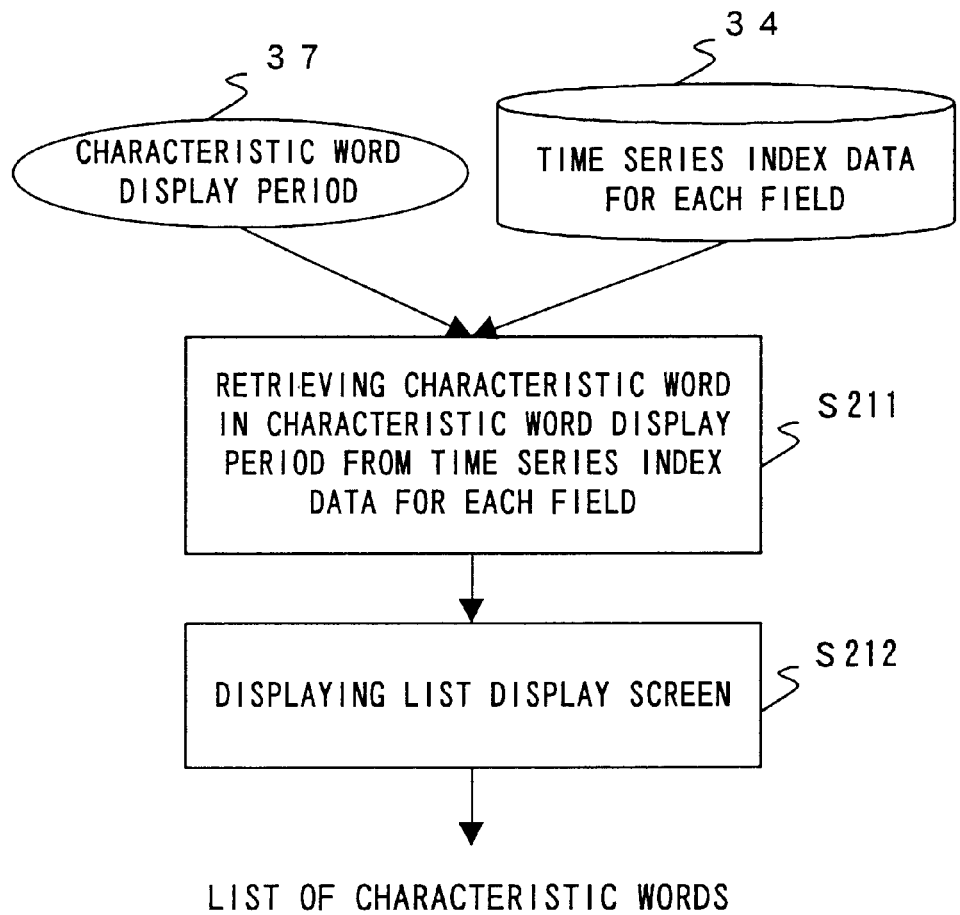
FIG. 21 is a flowchart of the process of a characteristic word display unit 38.

When the user specifies the characteristic word display period 37, the characteristic word display unit 38 retrieves the characteristic word in the characteristic word display period 37 from the time series index data 34 for each field in step S211 shown in FIG. 21. The retrieved characteristic word and a list of the number of occurrences are displayed on the screen (S212).

Figure 22:
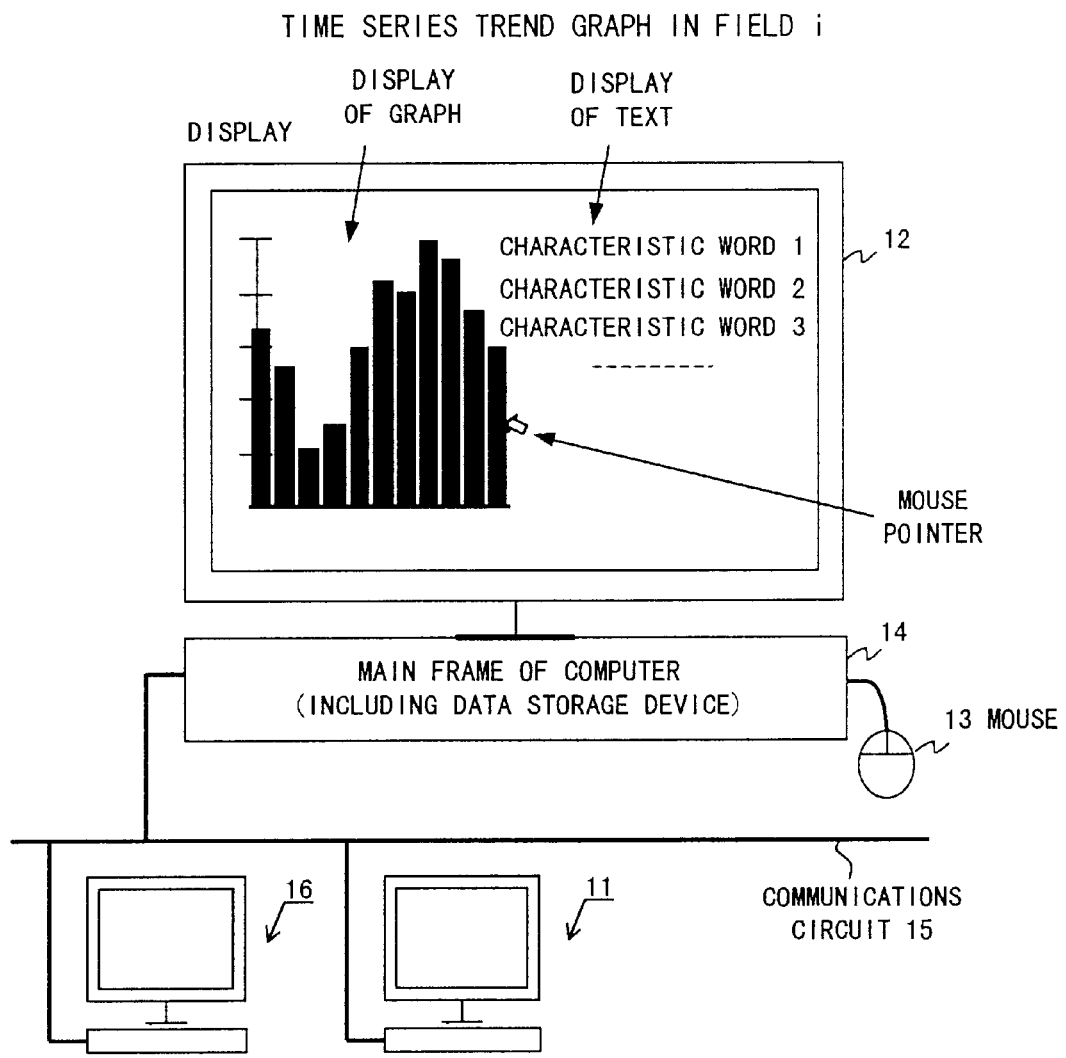
FIG. 22 shows the display state of a time series trend graph.
Figure 23:
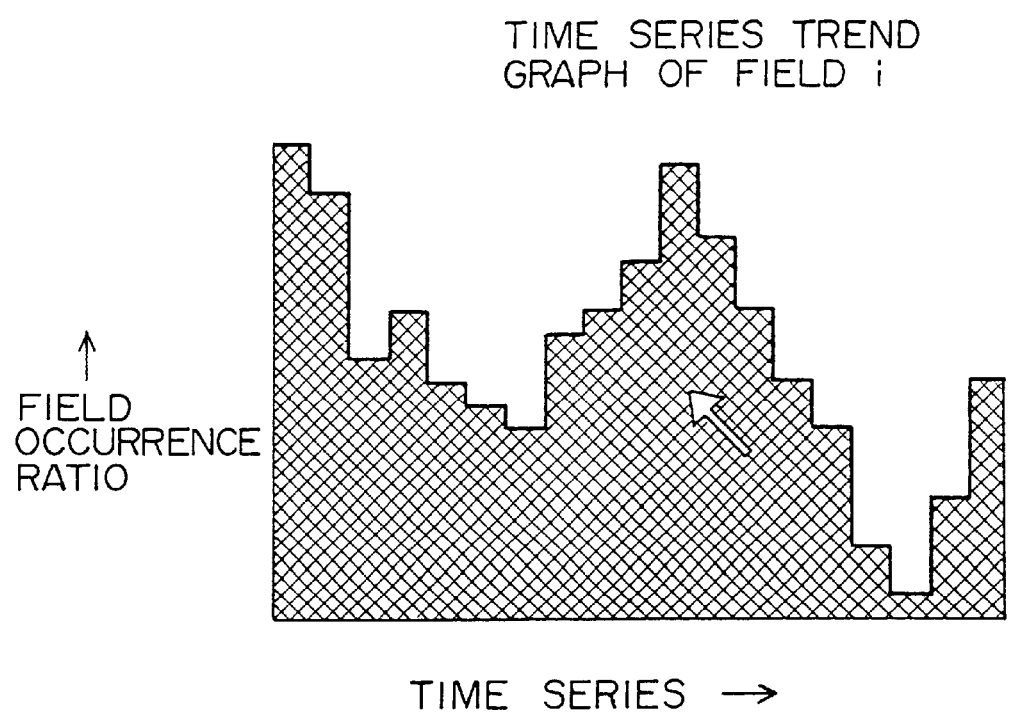
FIG. 23 shows a time series trend graph.

FIG. 22 shows the display state of the time series trend graph of the document data presentation apparatus according to the present embodiment. FIG. 23 shows the time series trend graph in the field i displayed by the display unit 12. The white arrow shown in FIG. 23 indicates a cursor of the mouse. When the cursor is set at the position of a specific bar graph and the mouse is clicked, the period in which a characteristic word is displayed can be specified.

FIG. 24 shows a list of characteristic words displayed when the mouse is clicked with the time series trend graph displayed and a desired bar graph pointed to. At this time, a predetermined number of characteristic words and the respective numbers of occurrences are displayed.

Thus, by specifying a field, a time series trend graph where the vertical axis indicates the field occurrence ratio and the horizontal axis indicates the year, month, day, etc. can be displayed. Then, if the user selects any displayed bar graph, a list of characteristic words of the document data 10 in the period of the selected bar graph is displayed. As a result, the user can easily understand how the amount of the feature of the document has changed with time, and can obtain a list of the characteristic words in each period. Thus, for example, the period in which the number of pieces of document data increases in a field can be obtained. Furthermore, by specifying a specific period, the characteristic word of the document data in the period and the number of occurrences of the characteristic word can be obtained. Therefore, the document data 10 can be limited using the characteristic word.

The process of the characteristic word selection and detection unit 39 detecting the characteristic word specified by the user from the list of the characteristic words, and the process of displaying a list of document data containing the characteristic words detected by the characteristic word selection and detection unit 39 are described below by referring to the flowcharts shown in FIGS. 25 and 26.

Figure 25:
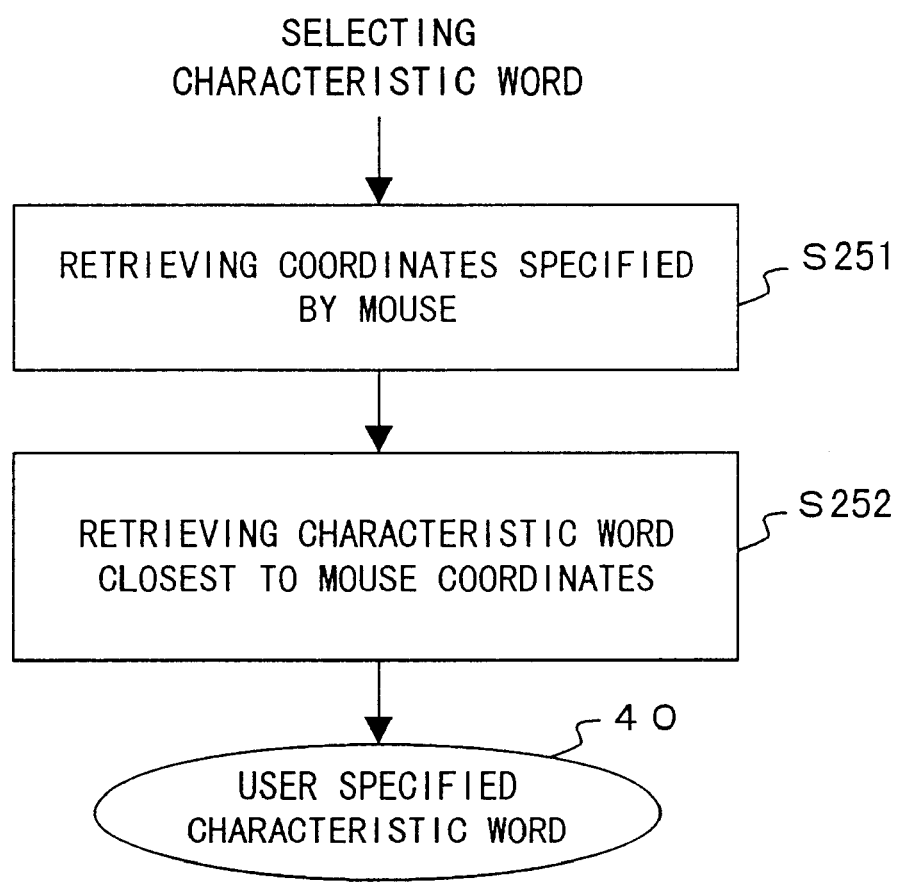
FIG. 25 is a flowchart of the process of a characteristic word selection and detection unit 39.
Figure 26:
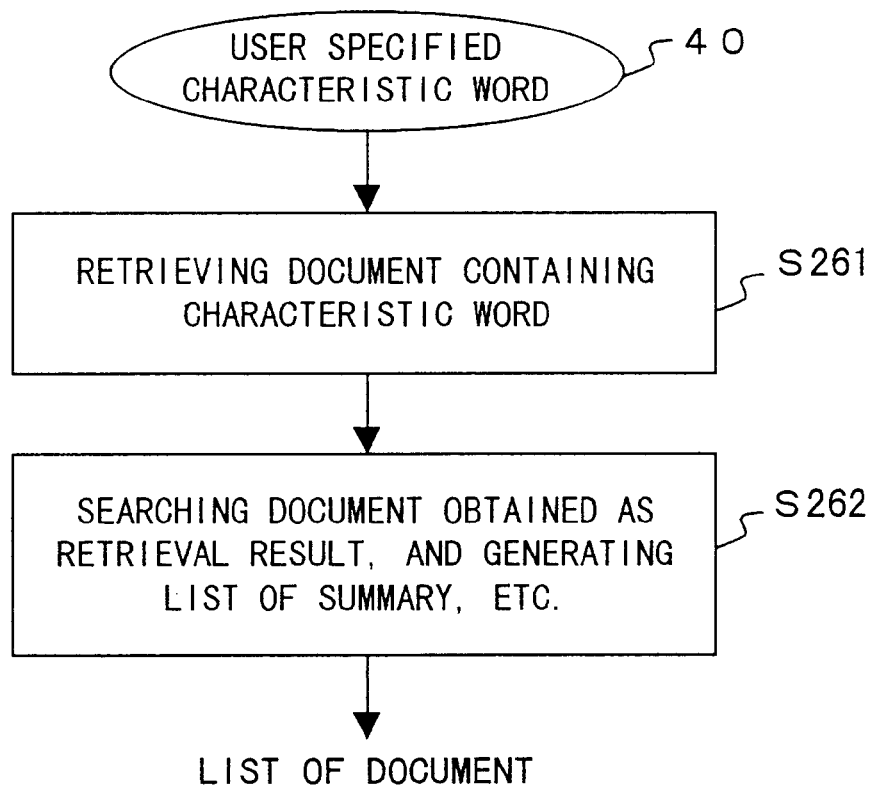
FIG. 26 is a flowchart of the process of a document list display unit 41.

When any characteristic word in the displayed list of characteristic words is specified using a mouse, the characteristic word selection and detection unit 39 computes the coordinates of the position specified by the mouse on the display screen in step S251 shown in FIG. 25. Then, the characteristic word displayed near the coordinates is retrieved as a user specified characteristic word 40 (S252).

Next, when the user specified characteristic word 40 is selected, the document list display unit 41 retrieves the document data containing the user specified characteristic word 40 from the document data 10 in the specified period in the same field. In addition, it obtains headers, summaries, etc. from the document data 10, and generates a list of documents containing document titles, summaries, etc. (S262).

Furthermore, when the user selects any document in the list of documents, the document selection and detection unit 42 computes the coordinates of the position specified by the mouse on the display screen in step S271 shown in FIG. 27. Then, the document ID displayed at the position closest to the computed coordinates is retrieved, and the document ID is defined as the document ID of a user specified document 43 (S272).

When the user specified document 43 is specified, the document display unit 44 searches a document database 45 using the document ID of the user specified document 43 in step S281 shown in FIG. 28, and retrieves corresponding document data 10.

Figure 29:
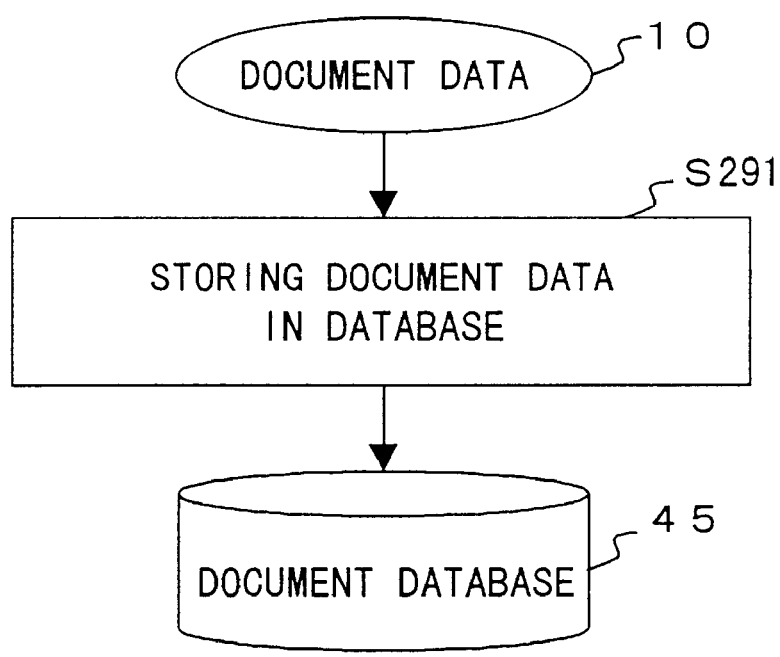
FIG. 29 is a flowchart of the process of a document data storage unit 46.

As shown in step 291 shown in FIG. 29, the document data storage unit 46 stores a large volume of document data 10 in the document database 45.

FIG. 30A is a list of documents containing the characteristic word w in the field i in the period k displayed by the document list display unit 41. FIG. 30B shows the contents of the document displayed by the document display unit 44.

In the document list shown in FIG. 30A, the document ID of the document containing the characteristic word selected by the user is displayed in association with the header of the document. When the header of a specific document is selected from the document list, the document ID of the selected document, the header of the document, and the text of the document are displayed as shown in FIG. 30B.

According to the present embodiment, the time series trend graph of the statistic amount of the set of the document data 10 in the same field in a predetermined period is displayed. When a specific period of the trend graph is specified, the characteristic word of the document data 10 in the specified period, the number of occurrences of the characteristic word, etc. can be displayed. For example, since the period in which the number of pieces of document data is increasing in a specific field can be detected, a document list containing the characteristic word can be displayed by displaying the characteristic words of the document data 10 in the period, and by selecting a specific characteristic word. Thus, the document data 10 can be limited, and the document data requested by the user can be easily and efficiently retrieved.

Next, the process of the user feature storage unit 47 storing user feature data 48 is described below by referring to the flowchart shown in FIG. 31.

First, when the user feature can be input, the user feature storage unit 47 displays the user feature input form on the screen in step S311 shown in FIG. 31.

The user feature input form comprises a plurality of input fields as shown in FIG. 32. The input fields contain the name of a company, the type of business, the name of a user, gender, age, and an item of interest.

Back in FIG. 31, when data is input to the user feature input form, the input user feature data 48 is stored.

FIG. 33A shows the configuration of the user feature data 48 stored in the user feature storage unit 47. FIG. 33B shows an example of the user feature data 48. The user feature data 48 contains the data input to the above described user feature input form, and comprises such data as the user ID, the type of business, the address of the company, age, an item of interest, etc.

Next, the process of the document designation history storage unit 49 for generating a user history by associating the user specified document 43 referred to by the user with the user feature data 48 is described below by referring to the flowchart shown in FIG. 34.

When the user specified document 43, current time data 50, and the user feature data 48 are provided, the document designation history storage unit 49 stores the document ID of the user specified document, the reference time, and the user feature data 48 at the time as document-specific user history data 51 of the referenced document data 10 in step S341 shown in FIG. 34. Similarly, the document ID of the user referenced document, the reference time, and the user feature data 48 are stored as the document-all user feature history data 52 (S342).

FIGS. 35A and 35B show the configurations of the document-specific user history data 51 indicating the document designation history of a specific user A and the document-all user feature history data 52 indicating the document designation history of all users.

The document-specific user history data 51 comprises such data as the document ID of the document data 10 specified by a user, the access time, the occupation, the address, the age, and an item of interest of the user, etc.

The document-all user feature history data 52 comprises the same data as the document-specific user history data 51, and is different only in that the document-all user feature history data 52 contains the feature history of all users.

The document-all user feature history data 52 is transmitted to the field feature computation unit 23, and is used as the training data for field classification by the field feature computation unit 23.

Next, the process, performed by the specific user history with group feature comparison unit 53, of obtaining the ratio of the document data 10 already referred to by the user in the document data 10 in the field in which the user takes interest is described below by referring to the flowchart shown in FIG. 36.

Figure 36:
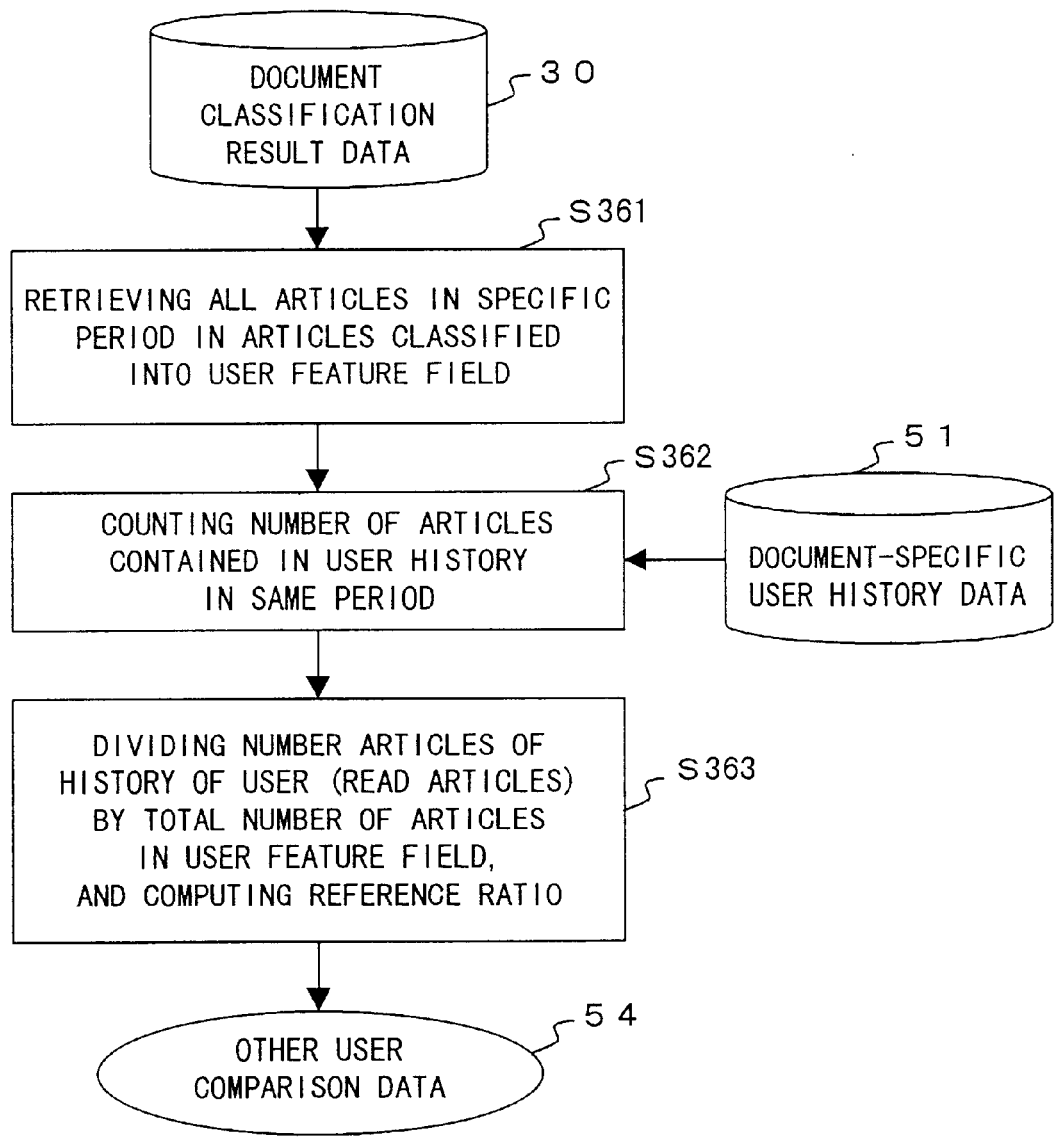
FIG. 36 is a flowchart of the process of a specific user history with group feature comparison unit 53.
Figure 38:
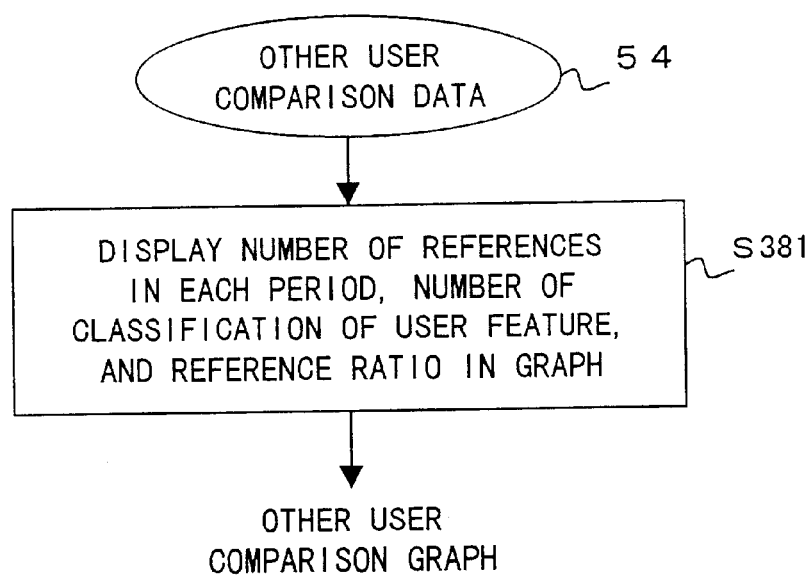
FIG. 38 is a flowchart of the process of other user comparison and display unit 55.

The specific user history with group feature comparison unit 53 retrieves all articles in a specific period from the document data 10, obtained from the user feature data 48, belonging to a specific field in which the user takes interest in step S361 shown in FIG. 36. Next, the number of articles contained in the document-specific user history data 51 in the same period is counted (S362). Then, the number of documents in the document-specific user history data 51, that is, the number X of documents already read by the user, is divided by the number A of documents belonging to the field of the user feature, the value of reference ratio X/A is computed, and the computation result is output as other user comparison data 54 (S365).

FIG. 37 shows the configuration of the other user comparison data 54. The other user comparison data 54 comprises the aggregation period of the document data already referred to in the document-specific user history data 51, and the data of the user reference ratio.

When the other user comparison data 54 is provided, other user comparison and display unit 55 displays as an other user comparison graph the number of references of document data in each period, the number of user feature classes, and the reference ratio.

Next, the process of the trend feature comparison unit 56 performed when a request to compare the trend of a specific field is issued is described by referring to the flowchart shown in FIG. 39.

The trend feature comparison unit 56 computes the increase or decrease of the statistic amount from the statistic amount in each period and the statistic amounts in the precedent and subsequent periods according to the time series data 32 for each field for which a trend comparison request has been issued, and the time series data 32 in each field. Then, the field for which a request to compare the trend has been issued is compared with each field in the increase or decrease in statistic amount in each period. The frequency at which the increase or decrease matches is counted, and the matching rate in all periods is computed (S392). The matching rate can be obtained by "the number of periods in which increase or decrease matches" divided by "the entire number of periods".

When the matching rate of the increase or decrease in statistic amount is obtained, the field indicating the matching rate higher than a predetermined value is listed as similarity trend data 57 (S393).

The similarity trend data 57 comprises the name of a field and the similarity (for example, the matching rate of increase or decrease) as shown in FIG. 40.

Figure 41:
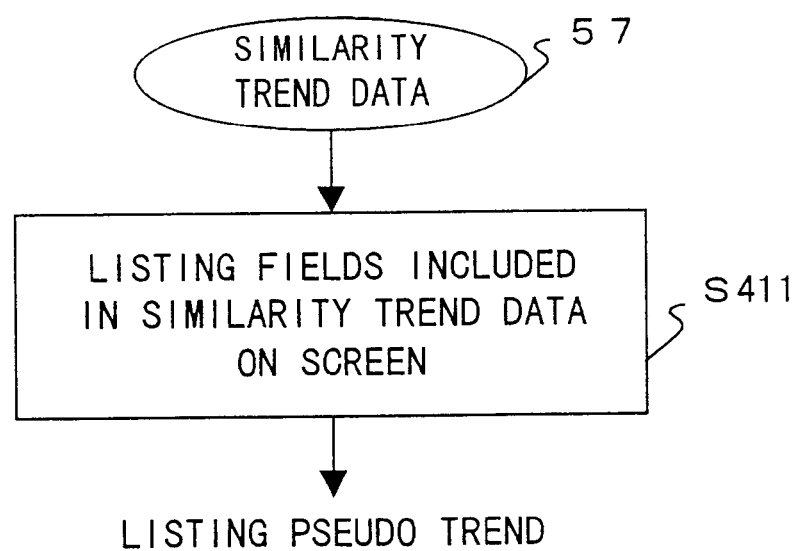
FIG. 41 is a flowchart of the process of a similar trend display unit 58.

When the similarity trend data 57 is obtained, the similar trend display unit 58 displays a list of fields of the similarity trend data 57 in order of similarity on the screen in step S411 shown in FIG. 41.

Since a field indicating a higher similarity level in trend feature with a specific field can be detected, the document data 10 in a related field can be efficiently retrieved.

Described below is the case where, in the document data presentation system with the above described configuration, the user specifies the field of aircraft accidents among the newspaper articles, displays a trend graph, specifies the specific period and a characteristic word in the trend graph, and displays a document containing a specific characteristic word.

FIG. 42 shows an example of the document data 10, and the document data 10 are stored in the document database 45 with the contents of a document associated with the document ID. For example, the article dated Jul. 20, 1998 as the issue date of the newspaper titled 'Over 100 people died of heat' is stored in the document database 45 in association with the document ID '980720-0001'.

FIG. 43A shows the dated document data 22. FIG. 43B shows the document classification result data 30. FIG. 32C shows an example of the time series data 32 for the field of accidents.

The document date computation unit 21 retrieves the generation date and contents date of the document data 10, and the dated document data 22 is generated with the document ID associated with the generation date and the contents date of the document data 10 as shown in FIG. 43A.

Then, the document classification unit 29 compares the field property vector of each of the fields 1 through n with the document property vector of the document data 10 to be classified, and the field to which the document data 10 belongs is determined so that the document classification result data 30 can be generated with the document ID associated with the field to which the document data belongs (for example, abnormal weather, weather information, etc.) as shown in FIG. 43.

Next, the document amount aggregation unit 31 aggregates the amount of document data in each field and period, and the time series data 32 for each field is generated with a field, a period, and the number of documents associated with each other as shown in FIG. 43.

FIG. 44 shows an example of the number of documents for each period in the field of aircraft accidents. In this example, the name of the field 'aircraft accidents' is associated with the period 'year and month' and the number of documents for respective contents.

Figure 46:
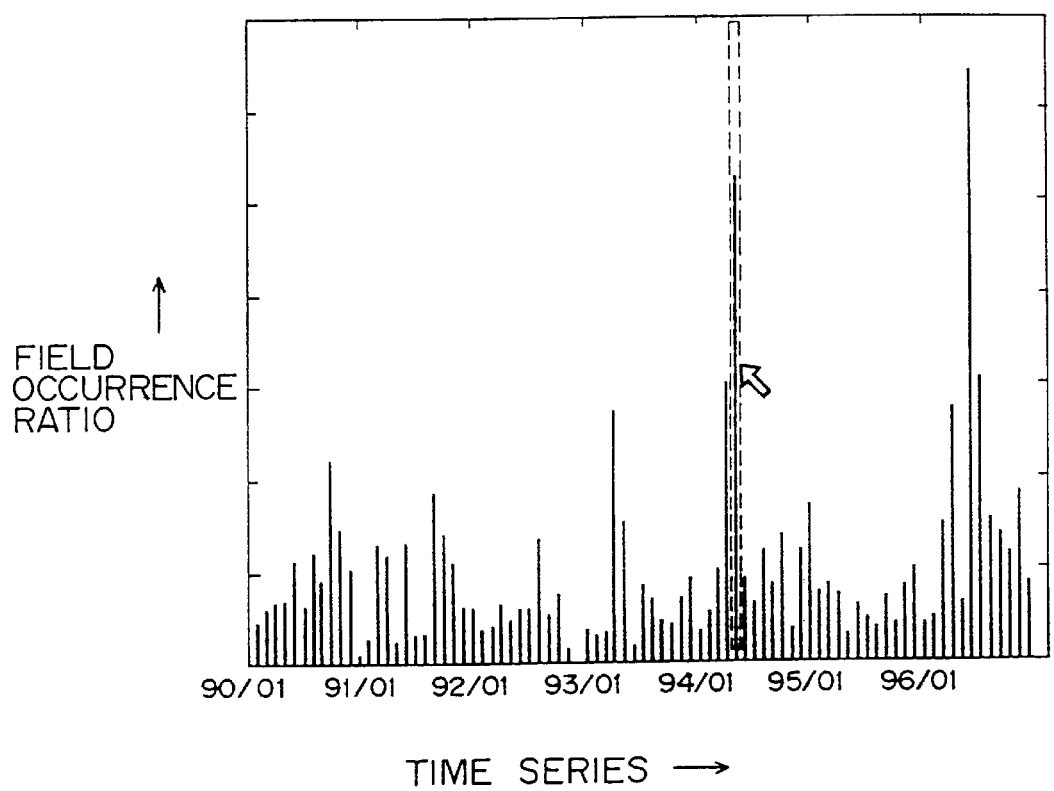
FIG. 46 shows the display state entered when a specific period is selected on the trend graph.

FIG. 45 is a trend graph showing the transition of the number of pieces of document data per month in the field 'aircraft accidents'. FIG. 46 shows the state of display when the specific period of the trend graph shown in FIG. 45 is specified using a mouse. As shown in FIG. 46, the cursor is moved to the position of the bar graph of the specific period. When the mouse is clicked, the bar graph for the specified period is encompassed by broken lines to indicate that the period has been selected. If the mouse is double clicked in this state, then the characteristic word and the number of occurrences of the characteristic word of the document data 10 having the generation date or the contents date in the period are displayed in order from the largest number of occurrences.

FIGS. 47A and 47B show examples of displaying lists of characteristic words generated when a specific period in the trend graph is selected using a mouse, etc. When a specific period in the trend graph is selected by a mouse, etc., the specified position is detected by the position detection unit 36, and the characteristic word display period 37 indicating in which period of the characteristic word is to be displayed on the characteristic word display unit 38. Then, the characteristic word display unit 38 retrieves the characteristic word in the period specified by the characteristic word display period 37 from the time series index data 34 for each field, thereby displaying a list of the retrieved characteristic words.

FIG. 47A shows an example of displaying a list of characteristic words of 'May in 1994' in the 'aircraft accidents' field. In this field, the number of occurrences of the 'China Airlines Accident' and the 'Aircraft Accident Search Committee of the Ministry of Transport' is the largest number 23, followed by the 'China Airlines Crash Accident', 'China Airlines', the 'Automatic Control Device', . . . in this order.

FIG. 47B shows the display state when the 'China Airlines Crash Accident' pointed to by the cursor is selected by the mouse with the list of characteristic words displayed. When a characteristic word is selected, the characteristic word selected by the user through the characteristic word selection and detection unit 39 is detected, and the list of summarized documents containing the characteristic word is displayed as shown in FIG. 48.

FIG. 49 shows the display state when the cursor is positioned at the third document data 10 with the list of summarized documents shown in FIG. 48 displayed. When a specific document data 10 is selected from the list of documents, the contents of the document data 10 specified as relating to the 'China Airlines Crash Accident' are displayed as shown in FIG. 50.

That is, when the user specifies a field to display the trend graph, and also specifies a specific period, the words indicating larger numbers of occurrences in the document data 10 in the specified period are displayed in order as characteristic words. When the user selects any characteristic word to be obtained from the displayed characteristic words, a list of documents containing the names of the documents in the document data 10 containing the characteristic word and the summary, etc. is displayed. Therefore, the document data 10 containing the specified characteristic word in the field requested by the user can be displayed by selecting a specific document data 10 from the list of the documents.

Next, FIG. 51 shows an example of the document clustering result data 28 clustered in document units by the document clustering unit 27. In this example, one cluster is assigned to each document data.

FIG. 52 shows a field property indicated when the cluster c00001 is defined as a field, and when the property of the field is expressed by the number of occurrences of a word.

In the document data 10 belonging to the field of the cluster c00001, the number 18 of occurrences of the word 'JR' is the largest, followed by the second largest number 10 of occurrences of the word 'seismic disaster'.

Figure 54:
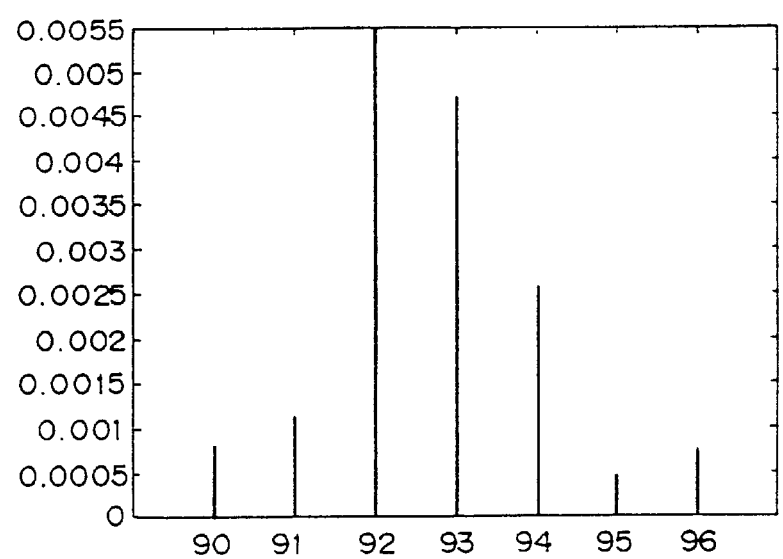
FIG. 54 shows the trend graph of a referred-to field 'Diet'.
Figure 55:
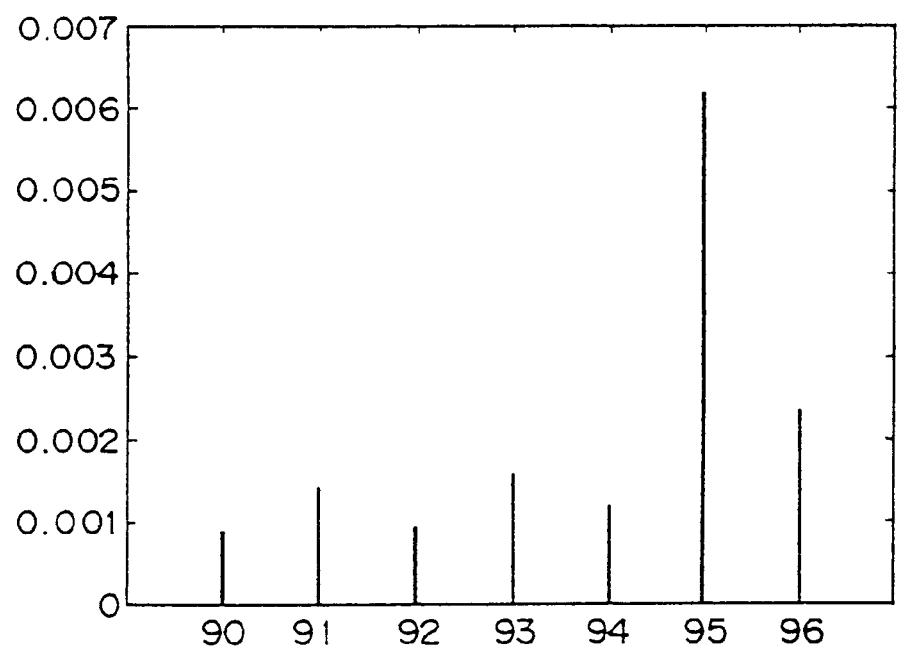
FIG. 55 shows the trend graph of a referred-to field 'earthquake'.

Then, the operation of the trend comparison unit 56 for determining the fields having similar trend features in the trend graph of a plurality of fields is described below by referring to FIGS. 53 through 55 indicating the trend graphs and FIGS. 56A and 56B indicating the increase or decrease in the trend graphs and the matching rate of the increase or decrease.

Figure 53:
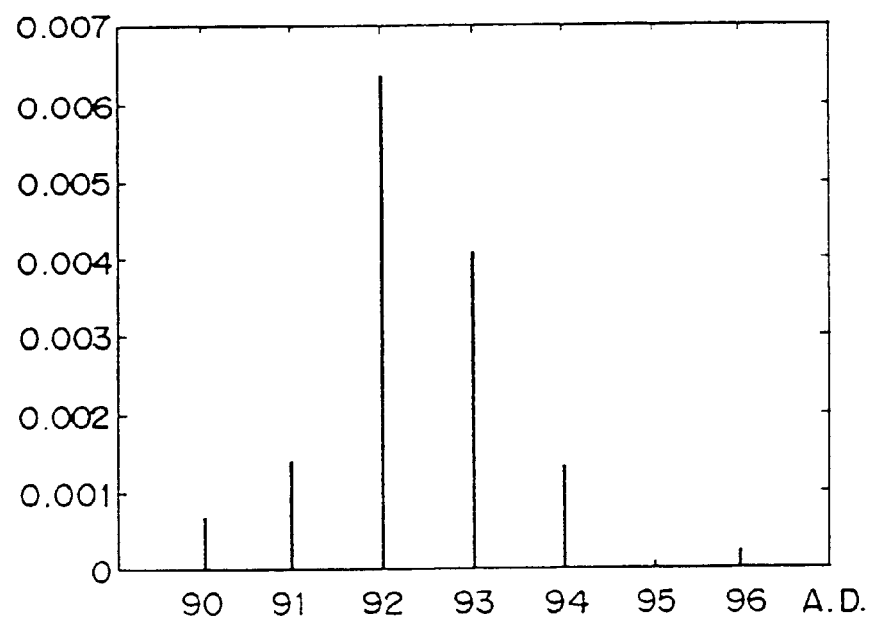
FIG. 53 shows the trend graph of a referred-from field 'political ethics'.

FIG. 53 shows the trend graph of the referred-from field 'political ethics' displayed by the trend graph display unit 35. FIG. 54 shows the trend graph of the field 'Diet' to be referred to. FIG. 55 shows the trend graph of the field 'earthquake' to be referred to.

Upon receipt of the request from the user to refer to the above described trend graphs, the trend feature comparison unit 56 determines whether the number of pieces of document data in each period in the trend graphs has increased or decreased compared with the period immediately before, and obtains the increase/decrease data of the number of pieces of document data in each field and period as shown in FIG. 56A. Then, the matching rate of the increase or decrease in number of pieces of document data in each period is obtained, and a table is generated as a list of similar fields of the 'political ethics' shown in FIG. 56B with the name of a field associated with the matching rate.

In FIG. 56A showing the increase or decrease in each period of the trend graph, the matching rate of the field 'Diet' to the field 'political ethics' is 100%, the matching rate of the field 'earthquake' to the field 'political ethics' is 67%, the matching rate of the field 'politics', although it is not shown in FIG. 56, to the field 'political ethics' is 100%, and the matching rate of the field 'political innovation' to the field 'political ethics' is 83%. Therefore, first in the list of fields similar with the field 'political ethics', the field name of the 'politics' and the matching rate '100%' are displayed as shown in FIG. 56B. Second, the field name 'Diet' and the matching rate '100%' are displayed. Third, the field name of the 'political innovation' and the matching rate '83%' are displayed. Thus, the field names and the matching rate are displayed in order of higher matching rate.

Therefore, the user retrieves the field having high similarity rate with a specific field from the list of similar fields, displays the trend graph in the field, and specifies a specific characteristic word in a specific period. Thus, document data in a field related to the specific field can be efficiently retrieved, and a desired document data 10 can be easily obtained.

Figure 57:
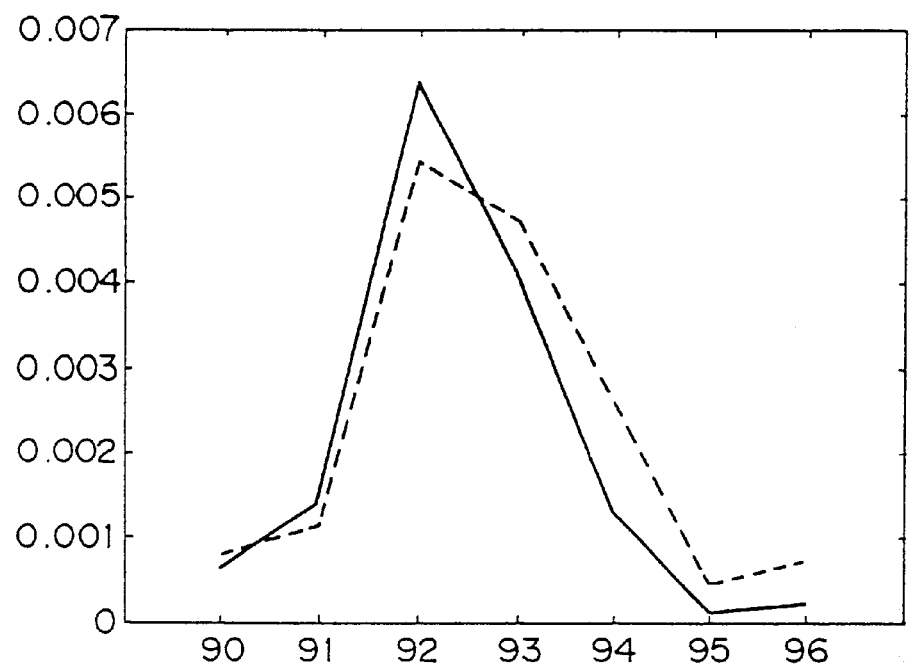
FIG. 57 shows the trend graph of referred-from and referred-to fields.

The trend graph display unit 35 can obtain the matching rate in the increase or decrease on the trend graph, display the matching rate, also display the time series data 32 for each field in the referred-from field and the referred-to field on the same screens as a graph as shown in FIG. 57, and determine the similarity on the graph.

Thus, by simultaneously displaying trend graphs of a plurality of fields, it can be immediately determined that the fields indicate similar trend features, thereby easily retrieving similar fields.

Described next is the case where the document data 10 can be presented based on the user document designation history data.

The document designation history storage unit 49 stores the document designation history of all users, and generates the document-specific user history data 51 describing the document designation history of a specific user as shown in FIG. 58A, and the document-all user feature history data 52 describing the document designation history of all users as shown in FIG. 58B. The document-all user feature history data 52 is transmitted to the field feature computation unit 23, and is used as the field feature data of a group of the document data 10 referred to by a user group having identical occupations and interest.

For example, the document data 10 accessed by a user A who is an 'engineer' and takes interest in 'software', 'LAN', 'OS', etc. can be known.

In addition, since the occupations and interest of all users can be known according to the document-all user feature history data 52, the document data 10 accessed by users in the groups having the same occupation or interest as the user A can be known.

FIG. 59 shows a set of fields of users whose occupation is an engineer. It is classified from the occupation of users listed in the document-all user feature history data 52 shown in FIG. 58B. According to the field set data of the occupation 'engineer', the document data 10 accessed by the users who are engineers can be known.

FIG. 60 shows the reference ratio of the document data 10 by a specific user in each period. In FIG. 60, the reference ratio is obtained as the ratio of X to A where A indicates the number of pieces of document data whose field feature is 'engineer' when the occupation of a specific user is 'engineer', and X indicates the number of pieces of document data referred to by the specific user in a specific period. According to the reference ratio, access information about the specific user, for example, what percentage of the document data 10 belonging to the field 'engineer' has been referred to by the specific user can be known.

Figure 61:
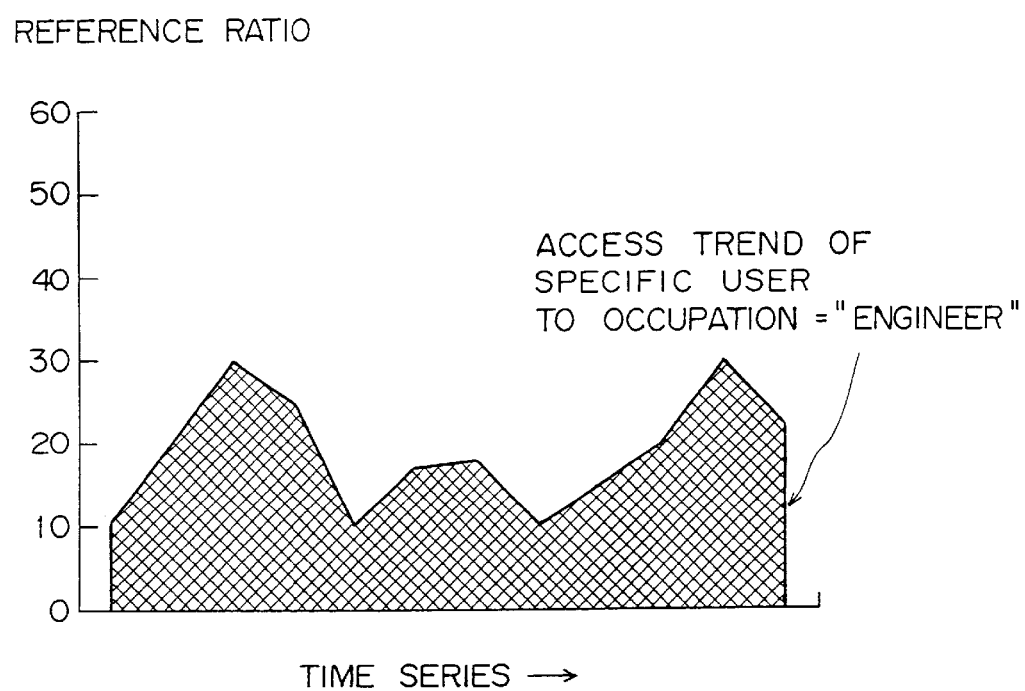
FIG. 61 shows the access trend of a specific user to the features of a plurality of users whose occupations are engineers.

FIG. 61 shows the access trend of a specific user to the feature of a plurality of users whose occupations are engineers. In FIG. 61, the vertical axis indicates the reference ratio of a specific user, whose user feature field is 'engineer', to the document data, and the horizontal axis indicates the time. The transition with time of the reference ratio of a specific user to the document data in a specific user feature field can be obtained. The access trend of a specific user can be obtained by, for example, the ratio of the number of pieces of document data accessed by a specific user to the number of pieces of all document data belonging to the user feature field of the specific user, or the ratio of the number of pieces of already read document data to the number of pieces of all document data in the user feature field (engineer, software, etc. as interest).

Furthermore, the program data relating to the present invention can be stored in a storage medium 621 such as a floppy disk, CDROM, etc., and the storage medium 621 is read by a medium drive unit (floppy disk driver, CDROM driver, etc.) of an information processing device 622 (personal computer, etc.). The read program data is stored in a storage device 623 such as a hard disk, etc. to execute the program. Otherwise, a program can be stored in a storage device 624 such as a hard disk, etc. in a computer of an information provider, transferred to the information processing device 622 of the user through communications, stored in the storage device 623 of the user equipment, and then executed. In addition, the program stored in the storage medium 621 can have only a part of the functions described in the flowchart showing the present embodiment.

According to the above described embodiment, a word contained in the document data is used as the feature information about a set of document data in the same field in a predetermined period. However, it is not limited to this application, but a word including a synonym, a phrase comprising a plurality of words, a sentence similar in meanings, etc. can also be used. Furthermore, the number of pieces of document data in a specific field in each period, or the ratio of the number of pieces of document data in a specific field in each period to the number of pieces of document data in all fields is used as the statistic information for display of a time series trend graph. However, it is not limited to these applications, but the ratio of the number of pieces of document data to the number of the pieces of the past document data in the same field, the ratio to the reference data, or the information other than the number of documents can also be used.

Since the present invention is designed to extract feature information from a set of document data within a predetermined period from the generation date of a document or the date in the document data in the same field, a user can select document data containing the feature information by obtaining the feature information about the document data by specifying a specific period and specifying feature information in plural pieces of feature information. Thus, the user can efficiently retrieve desired document data from a large volume of document data. Furthermore, a period in which statistic information changes can be detected by displaying the statistic information relating to a set of document data as a time series trend graph. In addition, document data containing specific feature information can be successfully selected by specifying any period in the displayed trend graph, and by displaying the feature information about the document data in the specified period, or the feature information with the statistic information. Thus, user-requested document data can be efficiently retrieved from a large volume of document data. In addition, by classifying document data according to the user feature information, document can be classified appropriately for each user feature. Furthermore, a period in which statistic information has changed can be detected by displaying the statistic information relating to a set of document data classified according to the user feature information as a time series trend graph. For example, document data in which users having the same user feature take interest can be efficiently retrieved by limiting the document data to the data in the detected period to be retrieved.

What is claimed is:

1. A document data presentation apparatus, comprising:
    a document feature information extraction unit calculating a number of occurrences of each of some words in document data and extracting and synthesizing document feature information composed of words and the number of occurrences of each word;
    a classification unit classifying document data into respective fields by comparing a preliminarily calculated field property vector of each of a plurality of fields and a text property vector corresponding to the document feature information; and a document information presentation unit extracting document data whose generation date is in a predetermined period in a same field or which contains a date in the predetermined period in a same field and displaying a number of extracted document data as a time series graph, and simultaneously displaying document feature information whose number of occurrences of each word in a designated period exceeds a predetermined value when a user designates an arbitrary period of a graph.

2. The apparatus according to claim 1, further comprising:
a field feature information generation unit setting document feature information composed of some words contained in reference document data whose field is specified and the number of occurrences of each word as the field feature information of a corresponding field; and a field classification unit calculating similarity between document feature information of document data to be classified and field feature information generated by the field feature information generation unit and classifying document data whose similarity exceeds a predetermined value into a field designated by the field feature information.

3. The apparatus according to claim 1, further comprising:
a field feature information generation unit extracting document feature information composed of some words contained in referenced document data having a user feature similar to a feature of a user that retrieves document data and the number of occurrences of each word and setting the document feature information as its field feature information; and a field classification unit calculating similarity between document feature information of document data to be classified and field feature information generated by the field feature information generation unit and classifying document data whose similarity exceeds a predetermined value into the field.

4. A document data presentation apparatus, comprising:
a document feature information extraction unit calculating a number of occurrences of some words in document data and extracting and synthesizing document feature information composed of the words and the number of occurrences of each word;

a field classification unit calculating similarity between a text property vector corresponding to document feature information extracted from the document feature information extraction unit and a preliminarily calculated field property vector corresponding to document data whose field is specified and classifying document data whose similarity exceeds a predetermined value into the field; and a document information presentation unit extracting document data whose generation is in a predetermined period or which contains a date in the predetermined period in a same field and displaying a number of extracted document data as a time series trend graph, and simultaneously displaying document feature information whose number of occurrences of each word in a designated period exceeds a predetermined value when a user designates an arbitrary period of the graph.

5. The apparatus according to claim 4, further comprising:
a field feature information generation unit handling document feature information generation unit handling document feature information as a cluster, calculating similarity among clusters, uniting clusters whose similarity is high and setting the document feature information of each cluster as field feature information when a number of clusters falls below a predetermined value, and a field classification unit calculating similarity between document feature information of document data to be classified and field feature information generated by the field feature information generation unit and classifying document data whose similarity exceeds a predetermined value into the field.

6. The document data presentation apparatus according to claim 4, wherein
said field classification unit means generates a partial document set comprising a set of document data in each field and period based on a result of cluster classification obtained in an automatic clustering process, compares a time series change of statistic information about the partial document set with a time series change of statistic information about a set of document data in each predetermined field and period, and associates a field classified by the automatic clustering process with the predetermined field.

7. The document data presentation apparatus according to claim 4, wherein
if an arbitrary word is selected as the document feature information when words whose number of occurrences exceeds a predetermined value are displayed, said document information presentation unit displays a list of document data containing the selected word.

8. The data presentation apparatus according to claim 4, wherein
said field classification unit further comprises a field estimation unit estimating a field related to the document data to be classified by calculating similarity between the time series change of statistical information about the document feature information of a set of document data in each predetermined period of a known field and the time series change of statistical information about the document feature information to be classified.

9. The document data presentation apparatus according to claim 4, wherein
said document feature information extraction unit means obtains statistic information about a weighted word from document data in each field and period, and extracts a characteristic word as the feature information according to the statistic information.

10. The data presentation apparatus according to claim 4, wherein
said document feature information extraction unit means obtains a number of occurrences of a word in the set of document data in each period as statistic information about the characteristic word, and extracts a word indicating a large number of occurrences as the characteristic word.

11. The document data presentation apparatus according to claim 4 wherein
said document information presentation unit statistic information obtaining means obtains a number of pieces of document data in a same field in each period or a ratio of a number of pieces of document data in each period to a number of pieces of all document data in each period as statistic information about the set of the document data.

12. The document data presentation apparatus according to claim 4, further comprising:
   a user document designation history information storage unit storing user feature information of a user as associated with document identification information about document data referred to by the user; and
   a classification unit classifying the document data according to the user feature information of the user that has referred to the document data.

13. The apparatus according to claim 12, further comprising
   access information obtaining means for obtaining access information about document data referred to by a specific user, and access information about document data referred to by a plurality of users sharing same user features with the specific user.

14. A document data presentation apparatus, comprising:
   a user document designation history information storage unit storing user feature information of a user as associated with document identification information indicating document data referenced by the user;
   a classification unit classifying the document data into respective fields by comparing a preliminarily calculated field property vector for each of a plurality of fields and a text property vector corresponding to the user feature information of the user that has referred to the document data;
   a document feature information extraction unit extracting and synthesizing document feature information composed of some words and a number of occurrences of each word from among a set of document data whose generation date is in a predetermined period in a same field of which contains a date in the predetermined period in a same field; and
   a document information presentation unit displaying a number of document data in a predetermined period as a time series trend graph, and simultaneously displaying document feature information whose number of occurrences of each word in a designated period exceeds a predetermined value when a user designates an arbitrary period of the graph.

15. A document data presentation system in which a document data presentation apparatus is connected to a display device for displaying document data through communications circuit, wherein:
   said document data presentation apparatus comprises:
      a document feature information extraction unit calculating a number of occurrences of each of some words in document data and extracting and synthesizing document feature information composes of the words and the number of occurrences of each word;
      a classification unit classifying document data into respective fields by comparing a preliminarily calculated field property vector of each of a plurality of fields and a text property vector corresponding to the document feature data; and
      a transmission unit extracting document data whose generation date is in a predetermined period in a same field or which contains a date in the predetermined period in a same field and displaying extracted document data as a time series trend graph, and simultaneously transmitting document feature information whose number of occurrences of each word in a designated period exceeds a predetermined value when a user designates an arbitrary period of the graph; and
   said display device comprises
      a reception unit receiving information from the said document data presentation apparatus; and
      a display control unit displaying a number of extracted document data in a predetermined period in a same field as a time series trend graph, and simultaneously displaying document feature information whose number of occurrences of each word in a designated period exceeds a predetermined value when an arbitrary period of the graph is designated.

16. A document data presenting method comprising:
   calculating a number of occurrences of each of some words in document data and extracting and synthesizing document feature information composed of the words and the number of occurrences of each word;
   classifying document data into respective fields by comparing a preliminarily calculated field property vector of each of a plurality of fields and a text property vector corresponding to the document feature information; and
   extracting document data whose generation date is in a predetermined period in a same field or which contains a date in the predetermined period in a same field and displaying a number of extracted document data as a time series trend graph, and simultaneously displaying document feature information whose number of occurrences of each word in a designated period when a user designates an arbitrary period of the graph.

17. The document data presenting method according to claim 16, wherein
   said document feature information extraction unit extracts words whose number of occurrences exceeds a predetermined value as characteristic words.

18. The method according to claim 15, further comprising the steps of:
   generating a first partial document set by classifying document data into respective fields according to field information preliminarily set by a user, and generating a second partial document set by classifying document data into respective fields by an automatic clustering process; and
   comparing a time series change of statistic information between the first and second partial document sets, and associating the fields classified by the automatic clustering process with the fields classified according to field information set by the user.

19. Document data presenting method according to claim 16, further comprising:
   storing user feature information of a user as associated with document identification information about document data referred to by the user; and
   classifying the document data according to the user feature information of the user who has referred to the document data.

20. The document data presenting method according to claim 16, further comprising:
   storing user feature information of a user as associated with document identification information indicating document data referenced by the user; and
   classifying the document data according to the user feature information of the user who has referred to the document data.

21. Computer-readable storage medium storing a program for performing a process, said process comprising:

calculating a number of occurrences of each of some words in document data and extracting and synthesizing document feature information composed of the words and the number of occurrences of each word;

classifying document data into respective fields by comparing a preliminarily calculated field property vector of each of a plurality of fields and a text property vector corresponding to the document feature information; and extracting document data whose generation date is in a predetermined period in a same field or which contains a date in the predetermined period in a same field and displaying a number of extracted document data as a time series trend graph, and simultaneously displaying document feature information whose number of occurrences of each word in a designated period exceeds a predetermined value when a user designates an arbitrary period of the graph.

22. The computer-readable storage medium according to claim 21, said process further comprising storing user feature information of a user as associated with document identification information about document data referred to by the user; and classifying the document data according to the user feature information of the user who has referred to the document data.

23. The computer-readable storage medium according to claim 21, said process further comprising:

storing user feature information of a user as associated with document identification information indicating document data referenced about document data referred to by the user;

classifying the document data according to the user feature information of the user who has referred to the document data.

* * * * *

UNITED STATES PATENT AND TRADEMARK OFFICE
CERTIFICATE OF CORRECTION

| | |
|---|---|
| PATENT NO. | : 6,912,536 B1 |
| APPLICATION NO. | : 09/360487 |
| DATED | : June 28, 2005 |
| INVENTOR(S) | : Ochitani |

It is certified that error appears in the above-identified patent and that said Letters Patent is hereby corrected as shown below:

Col. 22, line 35, change "15" to --16--.

Col. 22, line 47, delete "Document" and insert --The document--.

Col. 23, line 1, delete "Computer-readable" and insert --The computer-readable--.

Signed and Sealed this

Eleventh Day of July, 2006

JON W. DUDAS
*Director of the United States Patent and Trademark Office*